US011346819B2

(12) United States Patent
Aubry et al.

(10) Patent No.: US 11,346,819 B2
(45) Date of Patent: May 31, 2022

(54) METHODS AND SYSTEMS FOR NON-INVASIVELY CHARACTERIZING A HETEROGENEOUS MEDIUM USING ULTRASOUND

(71) Applicants: Centre National de la Recherche Scientifique, Paris (FR); ECOLE SUPÉRIEURE DE PHYSIQUE ET DE CHIMIE INDUSTRIELLES DE LA VILLE DE PARIS, Paris (FR)

(72) Inventors: Alexandre Aubry, Ivry-sur-Seine (FR); Amaury Badon, Brookline, MA (US); Victor Barolle, Saint Cloud (FR); Claude Boccara, Paris (FR); Laura Cobus, Paris (FR); Mathias Fink, Meudon (FR); William Lambert, Paris (FR)

(73) Assignees: Centre National de la Recherche Scientifique, Paris (FR); ECOLE SUPÉRIEURE DE PHYSIQUE ET DE CHIMIE INDUSTRIELLES DE LA VILLE DE PARIS, Paris (FR)

( * ) Notice: Subject to any disclaimer, the term of this patent is extended or adjusted under 35 U.S.C. 154(b) by 0 days.

(21) Appl. No.: 17/261,095

(22) PCT Filed: Jul. 16, 2019

(86) PCT No.: PCT/EP2019/069160
§ 371 (c)(1),
(2) Date: Jan. 18, 2021

(87) PCT Pub. No.: WO2020/016250
PCT Pub. Date: Jan. 23, 2020

(65) Prior Publication Data
US 2022/0003721 A1 Jan. 6, 2022

(30) Foreign Application Priority Data

Jul. 19, 2018 (FR) ...................................... 1856720

(51) Int. Cl.
*G01N 29/46* (2006.01)
*G01N 29/06* (2006.01)
*G01N 29/44* (2006.01)

(52) U.S. Cl.
CPC ......... *G01N 29/46* (2013.01); *G01N 29/0654* (2013.01); *G01N 29/4463* (2013.01);
(Continued)

(58) Field of Classification Search
CPC ............... G01N 29/46; G01N 29/0654; G01N 29/4463; G01N 29/0672; G01N 2291/02475; G01N 2291/106
See application file for complete search history.

(56) References Cited

U.S. PATENT DOCUMENTS

| 9,594,060 B2 * | 3/2017 | Fukutani | A61B 5/7207 |
|---|---|---|---|
| 2008/0245150 A1 * | 10/2008 | Katayama | G01N 29/44 73/602 |
| 2009/0241673 A1 * | 10/2009 | Kondo | G10K 11/346 73/625 |

OTHER PUBLICATIONS

J. Robert et al. "Green's function estimation in speckle using the decomposition of the time reversal operator: Application to aberration correction in medical imaging" The Journal of the Acoustical Society of America, vol. 123, No. 2; New York, US; Feb. 1, 2008 (13 pages).

(Continued)

*Primary Examiner* — Suman K Nath
(74) *Attorney, Agent, or Firm* — Osha Bergman Watanabe & Burton LLP

(57) ABSTRACT

In a first aspect, the present description relates to a system for non-invasively characterizing a heterogeneous medium using ultrasound, comprising at least one first array (10) of transducers configured to generate a series of incident ultrasound waves in a region of said heterogeneous medium and record the ultrasound waves which are backscattered by said region as a function of time, as well as a computing unit (42) which is coupled to said at least one first array of transducers and configured to: record an experimental reflection matrix defined between an emission basis at the input and the basis of the transducers at the output; determine, from said experimental reflection matrix, at least one first wideband reflection matrix defined in a focused base at the input and output; determine a first distortion matrix defined between said focused basis and an observation basis, said first distortion matrix resulting, directly or after a change of basis, from the term-by-term matrix product of said first wideband reflec- (Continued)

tion matrix defined between said focused basis and an aberration correction basis, with the phase-conjugated matrix of a reference reflection matrix defined for a model medium, between the same bases; determine, from said first distortion matrix, at least one mapping of a physical parameter of said heterogeneous medium.

16 Claims, 18 Drawing Sheets

(52) U.S. Cl.
CPC .............. *G01N 2291/02475* (2013.01); *G01N 2291/106* (2013.01)

(56) References Cited

OTHER PUBLICATIONS

G. Montaldo et al. "Coherent Plane-Wave Compounding for Very High Frame Rate Ultrasonography and Transient Elastography" IEEE Transactions on Ultrasonics, Ferroelectrics, and Frequency Control, vol. 56, No. 3; Mar. 1, 2009 (18 pages).
International Search Report issued in International Application No. PCT/EP2019/069160, dated Sep. 30, 2019 (4 pages).
Written Opinion issued in International Application No. PCT/EP2019/069160; dated Sep. 30, 2019 (6 pages).

* cited by examiner

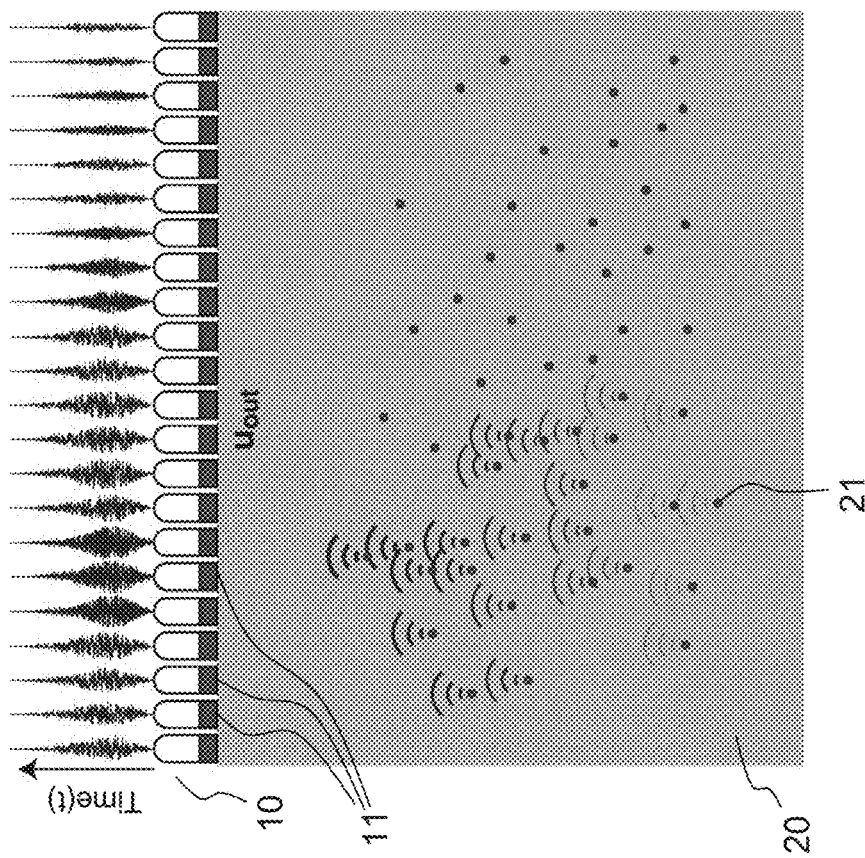
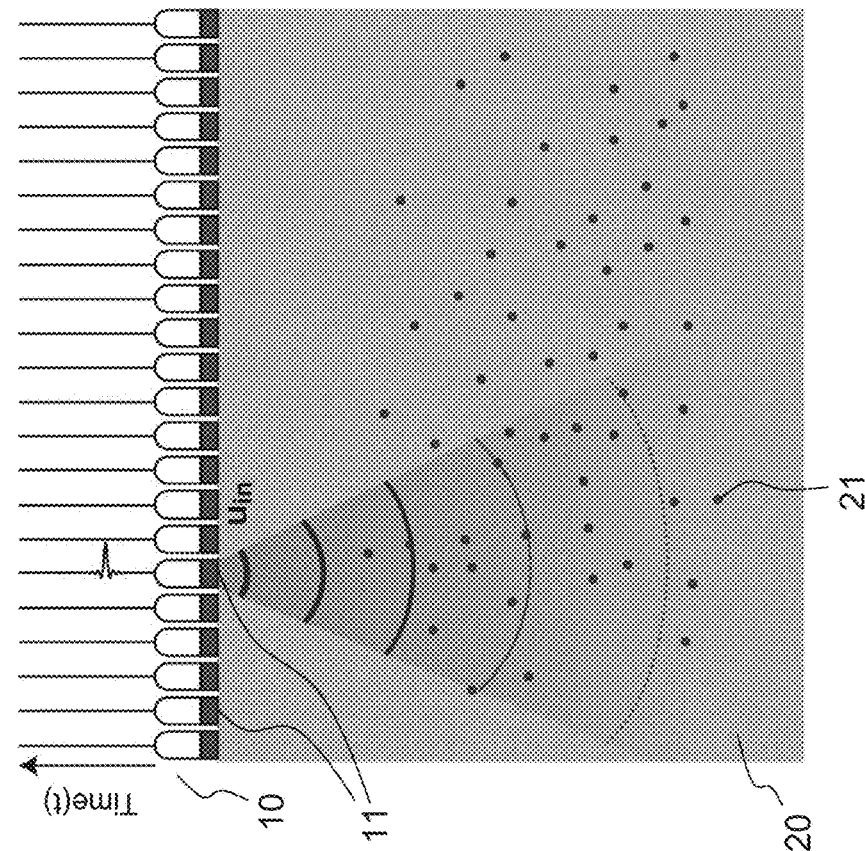
FIG. 1A (PRIOR ART)

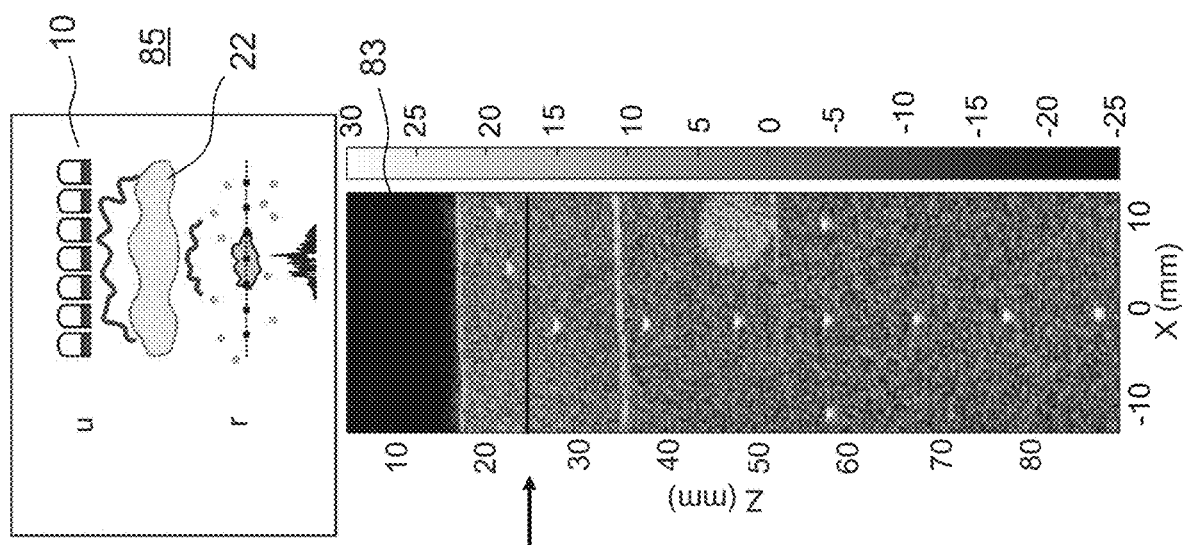
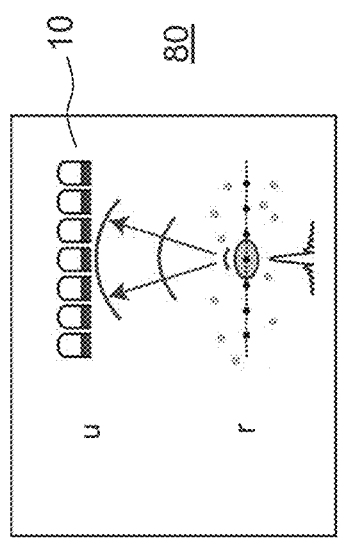
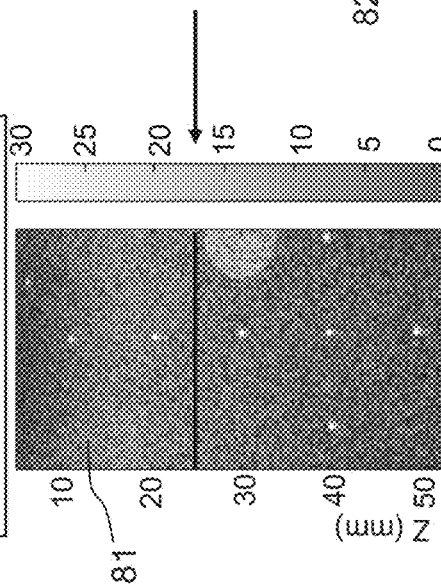
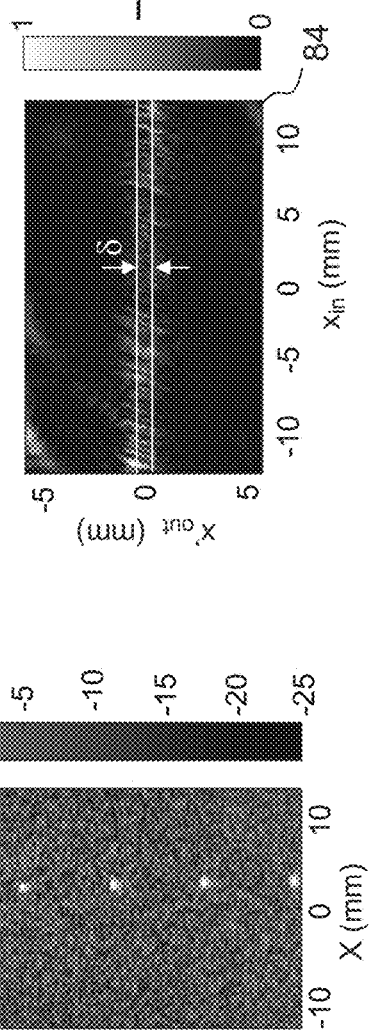
FIG.8

METHODS AND SYSTEMS FOR NON-INVASIVELY CHARACTERIZING A HETEROGENEOUS MEDIUM USING ULTRASOUND

TECHNICAL FIELD

The present description relates to methods and systems for the non-invasive ultrasound characterization of a heterogeneous medium, and applies in particular to medical imaging or to non-destructive testing and more generally to all of the fields in which ultrasound imaging may be used.

PRIOR ART

In the field of acoustic imaging, it is sought to characterize an unknown medium by actively probing it with ultrasound waves. This is, in particular, the principle of echography in medical imaging.

The resolution of an acoustic imaging system may be defined as the ability to discern the small details of an object. In principle, an acoustic imaging system is limited by diffraction and the theoretical resolution is given by $\lambda/2$ (where $\lambda$ is the wavelength of sound in the medium), or by the finite angular aperture of the detector. In practice, however, the resolution is often degraded by variations in the speed of sound in the propagation medium.

Specifically, most of the time in acoustic imaging, the medium is considered to be homogeneous, with a constant speed of sound co. However, the assumption of a homogeneous medium is not always met. For example, in the case of echography of the liver, the probe is placed between the ribs of the patient. The sound waves pass through a succession of layers of fat and muscle before reaching the target organ. Soft tissues have different mechanical properties. The speed of sound is therefore far from homogeneous, between 1450 m/s for adipose tissue and 1600 m/s for the liver. The variations in speed of sound cause a different phase shifting of the waves according to the locations through which they propagate. This results in an aberration of the acoustic wavefront which leads to a distortion of the resulting ultrasound image, and therefore to a degradation of its resolution and of its contrast. These aberrations may be such that they compromise the medical examination.

Over the last decades, various methods have been developed to correct aberrations, mainly in the field of medical imaging, in order to obtain an ultrasound image that has optimal resolution when this is degraded by the heterogeneities of the medium. However, in the case of complex aberrations, the wavefront distortions vary according to the regions of the image. Qualified as isoplanatic domains, these regions are often impossible to determine a priori and therefore constitute a fundamental limit for the application of the techniques of the prior art.

As illustrated in FIGS. 1A-1C, conventional echography methods use an array 10 of piezoelectric transducers 11 which may emit and receive ultrasound pulses independently. The position of each of the transducers is identified by the vector u. When such an array is placed facing a medium 20 that it is sought to study, the latter may be insonified in various ways.

The first way to insonify the medium to be studied is to emit an ultrasound pulse from one of the transducers of the array, the position of which is identified by $u_{in}$ (FIG. 1A, left-hand diagram). This results in a diverging cylindrical (or spherical) incident wave for a 1D (or 2D) array of transducers. This is reflected by the scatterers 21 of the medium 20 and the backscattered field is recorded by each of the transducers 11 as a function of time (FIG. 1A, right-hand diagram). By repeating this operation with each transducer used successively as source, it is possible to measure all of the impulse responses $R(u_{out}, u_{in}, t)$ between each transducer, where $u_{out}$ denotes the position of the detector. These responses form the reflection matrix $R_{uu}(t)$ expressed in the transducer base. The advantage of such a measurement resides in the fact that this matrix contains all of the information on the medium studied, a set of matrix operations then being able to be applied thereto for the purpose of imaging the medium, for example. However, such an acquisition assumes that the medium remains fixed throughout the duration of the measurements, which may be very limiting in the case of an in-vivo experiment. In addition, the energy emitted by a single piezoelectric element is low, which can cause a poor signal-to-noise ratio.

Other ways are known for insonifying the medium to be studied, known as "beamforming", these techniques referring to the coherent control of waves through the application of delay lines. Among these techniques, focused emission is known, a technique widely used by conventional echographs. As shown by FIG. 1B (left-hand diagram), it is just a matter of applying an appropriate set of delays to the transducers 11 in order to correct the travel times so that all of the pulses arrive together at the target focal point $r_{in}$. Due to the physical limits of diffraction, the ultrasound is concentrated in a region delimited by the aperture of the ultrasound probe. Note that in an echograph, the focusing is also carried out on reception. All of the echoes captured by the elements 11 of the array 10 are then processed so as to simulate the effect of a lens on reception, as described in FIG. 1B, right-hand diagram. The signals received by the transducers are put back into phase by shifting them temporally. These delays are identical to those applied on emission. In the emission phase, all of the signals interfere at the point $r_{in}$. On reception, the signals coming from this same point $r_{out}=r_{in}$ interfere electronically by summation of the signals in ballistic time $t=2\|u_{out}-r_{in}\|/c$. This summation gives the final result of the focusing on reception. The method illustrated in FIG. 1B, known as the confocal method with dual focusing on emission and on reception, makes it possible to directly image the reflectivity of the medium with a lateral resolution limited by diffraction, excellent axial resolution only limited by the duration of the initial pulse and excellent contrast. However, this method is time consuming because in any theory it is necessary to focus on emission at each of the points of the medium.

Another beamforming technique, developed more recently, consists in insonifying the medium with a series of plane waves. FIG. 1C illustrates the principle of this "plane-wave" echography, described for example in the article by G. Montaldo et al. "*Coherent plane-wave compounding for very high frame rate ultrasonography and transient elastography*" (*IEEE Trans. Ultrason., Ferroelect. Freq. Control* 56 489-506, 2009). Delays are applied to each signal on emission (FIG. 1C, left-hand diagram) so as to form a wavefront inclined at an angle $\theta_{in}$ with respect to the array of transducers 10. On reception (FIG. 1C, right-hand diagram), the field backscattered by the medium, $R(u_{out}, \theta_{in}, t)$, is measured by all of the sensors $u_{out}$ for a series of incident plane waves, the angle of incidence of which is varied $\theta_{in}$. All of these responses form a reflection matrix $R_{u\theta}(t)$ defined between the Fourier basis (or plane wave base) at input and the transducer basis at output. Once this matrix has been recorded, the signals are shifted temporally before being summed in a coherent manner in order to numerically focus the data on emission and on reception for each point $r_{in}$ of the ultrasound image. The number of acquisitions required to form an ultrasound image is lower in comparison with standard (focused emission) echography, and is so for the same level of contrast and resolution of the ultrasound image.

Inspired by the optical aberration correction techniques used in astronomy in the 1950s, adaptive focusing techniques have been introduced in order to correct phase distortion in ultrasound imaging (see for example D. J. Philips, S. W. Smith, O. T. Von Ramm and F. L. Thurstone, "*A phase compensation technique for B-Mode echoencephalography*". Ultrasound in Medicine, 1, 345-404, 1975).

As illustrated in FIG. 2, this correction technique applies to all conventional ultrasound imaging methods (FIGS. 1A-1C). This technique assumes a thin aberrating layer 22 which causes simple time shifts on the transducers 11. These may then be compensated by adding an additional delay law to the delays generally used in beamforming. As illustrated schematically in FIG. 2, this correction technique comprises the excitation (25) of the medium 20 without taking aberrations into account, the estimation (26-27) of the aberration law and new emission/reception (28-29) while taking the aberrator into account. Using a feedback loop between the emitter and the detector, the system is iterated in real time in order to find the optimal time shifts for correcting the aberration. Several approaches have been proposed to calculate the delays to be applied to each of the transducers of the array on the basis of the ultrasound speckle, that is to say the signal resulting from the reflection of the ultrasound by a random distribution of under-resolved scatterers. One method is based on correlations between the signals received by adjacent transducers (see for example M. O'Donnell and S. W. Flax. "*Phase aberration measurements in medical ultrasound: Human studies*", Ultrasonic Imaging 10, 1-11, 1988). Another method is based on the contrast optimization of the ultrasound speckle (L. Nock, G. E. Trahey and S. W. Smith "Phase aberration correction in medical ultrasound using speckle brightness as a quality factor", J. Acoust. Soc. Am, Vol. 85, 5, pp 1819-1833, 1989). However, these correction techniques are based on the assumption of a thin aberrating layer 22 which is located as close as possible to the array of transducers 10. For a volumic aberrator, these methods are therefore only valid on a single isoplanatic domain.

The concept of isoplanatic domains is illustrated in FIGS. 3A-3B. An aberrator 22 is present between the array of transducers 10 and the focal plane. In the example of FIG. 3A, delays are applied to the transducers 11 of the array of transducers 10 such that the front of the sound wave at output of the aberrator 22 is corrected (cylindrical wave). This results, at a given point $r_{in}$ of the focal plane, in a diffraction-limited focal spot. If this same corrected wavefront is slightly angulated (FIG. 3A) (or translated) so as to allow focusing at a point $r'_{in}$ such that $|r_{in}-r'_{in}|<l_c$, where $l_c$ is a parameter characteristic of the aberrator, called the coherence length of the aberrator, then the wavefront coming from the aberrator remains corrected and the focusing is always diffraction-limited at $r'_{in}$. The points $r_{in}$ and $r'_{in}$ belong to the same isoplanatic domains of the insonified region. However, if the corrected incident wavefront is further angulated (FIG. 3B) so as to allow focusing at a point $r'_{in}$ such that $|r_{in}-r'_{in}|>l_c$, then the wavefront coming from the aberrator is distorted and the correction applied does not allow diffraction-limited focusing at $r'_{in}$. The points $r_{in}$ and $r'_{in}$ in this case belong to different isoplanatic domains of the insonified region.

Beyond a correction field limited to a single isoplanatic domain, the aberration correction techniques mentioned above do not generally work for ultra-wideband signals (such as those used in ultrasound imaging), since each spectral component of the wave field may undergo a different phase distortion. For ultra-wideband correction of aberrations in ultrasound imaging, more sophisticated methods have been developed, such as inverse or matched filtering methods derived from the concept of time reversal. They consist in convolving the signals emitted and received by suitable spatio-temporal filters making it possible to optimize the focusing of the waves in the medium and to correct the aberrations thereof. However, knowledge of this filter requires the presence of a strong scatterer (C. Prada and M. Fink, "Eigenmodes of the time reversal operator", Wave Motion, 20, 151-163, 1994) or an array of detectors within the medium that it is sought to image which is particularly invasive (see for example M. Tanter, J.-L. Thomas and M. Fink. "Time reversal and the inverse filter", J. Acoust. Soc. Am. 108, 223-234, 2000).

A more recent approach benefits directly from the reflection matrix and its correlation matrix in order to iteratively correct aberrations in the ultrasound speckle. Thus, in the article by J-L. Robert et al. ("*en's function estimation in speckle using the decomposition of the time reversal operator: Application to aberration correction in medical imaging*", J. Acoust. Soc. Am., 123, 2 (2008)), it is a matter of measuring the reflection matrix $R_{ur}$ between a focused emission basis at input and the transducer basis at output. The set of the emissions focused at points $r_{in}$ of the medium may be seen as an array of virtual transducers placed within same, their respective size being given by each focal spot. Thus this reflection matrix contains the set of the impulse responses $R(u_{out}, r_{in}, t)$ between each transducer of a virtual array ($r_{in}$) within the medium studied and each transducer ($u_{out}$) of the real array. By limiting the size of the virtual array to one isoplanatic domain, it has been shown that the first eigenvector of the correlation matrix $R_{ur}R_{ur}^\dagger$, where $R_{ur}^\dagger$ is the transconjugate matrix (or transpose matrix of the conjugate matrix) of $R_{ur}$, gives the wavefront making it possible to focus on a virtual scatterer (artificial star) the size of which is given by the initial focal spot. By angulating this wavefront, it is possible to focus at each of the points of the isoplanatic domain. It is then possible to reiterate the process with this new focused emission base, reconstruct a new reflection matrix $R_{ur}$ and access a more precise aberration correction law etc. One of the drawbacks of this approach is the need to iterate the process, which significantly decreases the frame rate. Additionally, like the other techniques of the prior art, the image correction field is, once again, limited to a single isoplanatic domain.

In the context of the present description, an original method is proposed which is not based on the generation of an artificial star, nor on an iterative approach. The proposed method also makes it possible to simultaneously correct the aberrations in the various isoplanatic domains of a speckle image, which may also contain more deterministic objects (interfaces, large scatterers, etc.) which give rise to specular reflection of the incident wave.

SUMMARY

The present description relates, according to a first aspect, to a method for the non-invasive ultrasound characterization of a heterogeneous medium, the method comprising:

a step of generating, by means of at least a first array of transducers, a series of incident ultrasound waves in a region of said heterogeneous medium;

a step of recording an experimental reflection matrix defined between an emission basis at input and the transducer basis at output;

a step of determining, on the basis of said experimental reflection matrix, at least a first wideband reflection matrix, defined in a focused basis at input and at output, in a first spectral band;

a step of determining a first distortion matrix defined in said first spectral band, between said focused basis and an observation base, said first distortion matrix resulting, directly or after change of base, from the term-by-term matrix product of said first wideband reflection matrix, defined between said focused basis and an aberration correction base, with the phase conjugate matrix of a reference reflection matrix, defined for a model medium, between the same bases;

a step of determining, on the basis of said first distortion matrix, at least one mapping of a physical parameter of said insonified region of said heterogeneous medium.

As will be described in more detail in the remainder of the description, a physical parameter of the heterogeneous medium may comprise, for example: an aberration law associated with at least one isoplanatic domain contained in the insonified region, a parameter characteristic of the local reflectivity of the medium, a parameter characteristic of the speed of sound in the medium, a multiple scattering rate.

A heterogeneous medium within the meaning of the present description comprises any medium comprising scatterers exhibiting a break in acoustic impedance with respect to that of a surrounding medium, said surrounding medium also possibly exhibiting a spatially inhomogeneous speed of sound (e.g. multilayer medium). The methods and systems described in the present description allow in particular a non-invasive deep ultrasound characterization of such a heterogeneous medium.

The aberrations of an ultrasound wavefront propagating through a heterogeneous medium correspond to the difference between the wavefront coming from this medium and that which would be expected in an ideal case. These aberrations may be linked, for example, to spatial fluctuations in the speed of sound in the medium. For example, in the case of echography, the sound waves pass through various types of tissue before reaching the target organ. Since soft tissues have different mechanical properties, the speed of sound is far from homogeneous. This results in an aberration of the acoustic wavefront which leads to a distortion of the resulting ultrasound image, and therefore to a degradation of its resolution and of its contrast. These aberrations may be such that they compromise the medical examination.

An optimal aberration correction basis is a basis that maximizes the size of the isoplanatic domains contained in the insonified region. For example, an aberration correction basis may be the transducer basis in the case of a thin aberrator located near the transducer array, or the plane wave basis in the case of a translation invariant multilayer medium. In the general case of a spatially inhomogeneous volumic aberrator, there are a plurality of isoplanatic domains regardless of the aberration correction basis considered. Studying the distortion matrix may then make it possible to determine the aberration laws associated with each of these regions.

The focused basis may be contained in a single focal plane located at a given depth with respect to the array of transducers in the medium, or may be defined in a volume by simultaneously considering focus points located at different depths.

The emission basis in which the experimental reflection matrix is recorded may equally be the transducer base, the plane wave basis ("Fourier base") or any focused basis.

A reflection matrix or the distortion matrix may be defined between various bases, the change of basis being performed either through application of delay lines in the time domain or through matrix products with propagation matrices in the frequency domain. In the remainder of the description, the term "focused" reflection matrix or "focused" distortion matrix refers, respectively, to a reflection matrix or distortion matrix defined in a focused basis at input and at output.

The experimental reflection matrix recorded is a "real" matrix, that is to say one composed of real coefficients in the time domain, the electrical signals recorded by each of the transducers being real numbers. However, the wideband focused reflection matrix is a "complex" matrix, that is to say one composed of coefficients formed of complex analytical signals. The complex analytical signals which form the wideband focused reflection matrix may be obtained by retaining only the positive frequencies of the spectrum of the electrical signals recorded; their argument coincides with the phase of the waves reflected by the medium.

The model medium or reference medium is for example a homogeneous medium in which the speed of sound is constant. The reference reflection matrix (or more simply "reference matrix") may be established theoretically for this reference medium as a propagation matrix, that is to say a reflection matrix for the ultrasound waves obtained for this reference medium with, as reflector, a virtual plane mirror in each focus plane. Depending on the degree of knowledge a priori of the propagation medium, the reference medium may take more elaborate forms (e.g. multilayer medium etc.).

The term-by-term matrix product or "Hadamard product" of the first wideband reflection matrix defined between the focused basis and the aberration correction basis with the phase conjugate matrix of a reference reflection matrix, defined for a model medium, between the same bases, amounts to subtracting, from the phase of each element of the first wideband reflection matrix, the phase of the corresponding element of the reference reflection matrix. Specifically, the elements of a matrix or phase conjugate (or more simply "conjugate" in the present description) of a first matrix are complex numbers having the same modulus as those of the first matrix but being of opposite phase. An expected ballistic component (defined by the model medium) is thus subtracted from the phase of each element of the first wideband reflection matrix, which makes it possible to isolate the distorted component of the field reflected by the medium for each input focused emission. The applicants have shown that analyzing the distortion matrix makes it possible in particular to discriminate the isoplanatic domains contained in the insonified region and to determine, in the observation plane, an aberration law associated with each isoplanatic domain.

According to one or more exemplary embodiments, the observation basis is the aberration correction base. It is possible to seek to determine the first distortion matrix between the focused basis and the aberration correction base, for example to quantify and/or correct aberrations.

In such a case, the determination of the first distortion matrix may comprise:

a change of base, at input or at output, of said first wideband focused reflection matrix to obtain said first wideband reflection matrix determined between the focused basis and the aberration correction base; and the term-by-term matrix product of said first wideband reflection matrix with the phase conjugate matrix of the reference reflection matrix defined between the same bases.

According to one or more exemplary embodiments, the observation basis is the focused basis and reference is made to a "focused" first distortion matrix. It is possible to seek to determine a "focused" distortion matrix, that is to say one defined in the focused basis at input and at output, for example in order to determine a mapping of the spread function (or PSF for "point spread function"), the spread function being defined as the spatial impulse response between the focused bases at input and at output; on the basis of the PSF, it is possible, for example, to locally quantify the focus quality (i.e. the level of aberrations), the speed of sound or the multiple scattering rate in the insonified region of the medium studied.

The focused first distortion matrix may be obtained through change of basis from the first distortion matrix defined between the focused basis and the aberration correction base.

Alternatively, the focused first distortion matrix may be constructed directly on the basis of the first wideband focused reflection matrix by means of a spatial correlation between each row and/or column of said first wideband focused reflection matrix and the same row and/or column of the reference reflection matrix defined in the same base. On the basis of the focused first distortion matrix, it will be possible just through change of basis to determine the first distortion matrix defined between the focused basis and the aberration correction base.

According to one or more exemplary embodiments, the determination of said first wideband focused reflection matrix comprises:
 a change of basis at input and at output of said experimental reflection matrix expressed in the frequency domain to form a focused reflection matrix;
 a coherent summation on said first spectral band of said focused reflection matrix to form said first wideband focused reflection matrix.

Alternatively, the first wideband focused reflection matrix may be obtained by applying time shifts to the experimental reflection matrix. However, such an approach does not allow analysis of the experimental data on different spectral bands, which may be detrimental in the event of frequency dispersion of the aberrations.

According to one or more exemplary embodiments, the determination of at least one mapping of a physical parameter of said heterogeneous medium comprises:
 determining the invariants in said focused basis of said first distortion matrix, in order to identify at least one first isoplanatic domain in said focused basis;
 determining, for each first isoplanatic domain identified, a mapping of at least one first aberration law in said correction base.

Several methods may be implemented in order to determine the isoplanatic domains and the associated aberration laws on the basis of the first distortion matrix. According to one or more exemplary embodiments, the determination of these invariants comprises a singular value decomposition of said first distortion matrix, a singular value decomposition of said first distortion matrix normalized, that is to say the modulus of each of the elements of which will have been normalized but the phase of which will have been preserved, or a singular value decomposition of a normalized correlation matrix of said first distortion matrix, that is to say a correlation matrix of said first distortion matrix the modulus of each of the elements of which has been normalized.

Assuming in particular specular reflection by the heterogeneous medium, the applicants have shown that a mapping of the local reflectivity of the heterogeneous medium for the entirety of the insonified region may be obtained by means of a linear combination of the singular vectors of said first distortion matrix.

The applicants have also shown that the singular value decomposition of the distortion matrix makes it possible to filter the noise subspace (random matrix without correlation between its rows and columns) of the signal subspace (matrix characterized by substantial correlations between its rows and/or its columns), the noise subspace containing both the experimental noise and the incoherent contribution of the reflected field caused by multiple scattering events occurring upstream of the focused base.

According to one or more exemplary embodiments, the ultrasound characterization method further comprises determining, in said observation base, a first reflection matrix corrected by said one or more first aberration laws. This makes it possible, in particular when assuming a random scattering reflection by the sample, to determine a mapping of the local reflectivity of the medium, or "image", corrected for aberrations.

On the basis of said corrected first reflection matrix of the insonified region, it is possible, according to one or more exemplary embodiments, to determine a distortion matrix corrected for aberrations corresponding, in said aberration correction base, to the term-by-term matrix product of said corrected reflection matrix determined in said aberration correction basis with the phase conjugate matrix of said reference reflection matrix. The distortion matrix corrected for aberrations makes it possible, by determining its invariants in the focused basis, to refine the correction in the first isoplanatic domain identified. It also makes it possible to identify at least one second isoplanatic domain in the focused basis and to determine, for each second isoplanatic domain identified, a mapping of a second aberration law in the aberration correction base. The method may thus be iterated as many times as necessary depending on the number of isoplanatic domains contained in the insonified region in order to obtain a mapping of the local reflectivity of the medium, or "image", corrected for aberrations. This iterative process applies more particularly when assuming a random scattering or intermediate reflection, that is to say a mixed specular and random scattering reflection.

According to one or more exemplary embodiments, the determination of at least one mapping of a physical parameter of said heterogeneous medium comprises determining, for at least one first isoplanatic domain identified, a first spread function (PSF) in said focused basis. The spread function corresponds to the spatial Fourier transform of the aberration law measured in the aberration correction plane. It is spatially invariant over each isoplanatic domain. It may be obtained, according to one example, from the singular value decomposition of the focused distortion matrix, that is to say defined in the focused basis at input and at output.

According to one or more exemplary embodiments, the determination of at least one mapping of a physical parameter of said heterogeneous medium comprises determining the speed of sound in the insonified region. This involves studying, for example, the change in the first singular value of the distortion matrix as a function of the speed model used to model the reference matrix. The optimal speed model is that which maximizes the first singular value of the distortion matrix. An alternative is to study the focused distortion matrix. Specifically, this makes it possible to study the change in the spread function as a function of the speed model used for the calculation of the reference matrix. The optimal speed model is that which minimizes the width of the wavelength-normalized spread function.

According to one or more exemplary embodiments, the determination of at least one mapping of a physical parameter of said heterogeneous medium comprises determining a multiple scattering rate in the insonified region. This involves studying, for example, the focused distortion matrix for which aberrations will have been corrected beforehand. The ratio of the average of the incoherent intensity (multiple scattering) obtained beyond the focal spot to the intensity at the focus point (central row of the distortion matrix) gives access to a local multiple scattering rate.

According to one or more exemplary embodiments, the characterization method further comprises the identification and/or elimination of the specular component of the reflected field and/or of the multiple reflections arising between the array of transducers and the various interfaces or layers of the heterogeneous medium. To this end, the distortion matrix may be projected into the Fourier basis both at input and at output. In this base, the specular and multiply reflected components of the field appear for precise reflected and incident angle pairs. They may therefore be easily filtered and only the random scattering component (speckle) of the reflected field is retained. This discrimination of the random scattering component then allows direct access to the aberration laws to be applied at input and output in order to correct the reflection matrix and obtain an optimal image of the medium, which is not possible if the specular component predominates. In addition, the filtering of the distortion matrix in the Fourier plane makes it possible to eliminate the multiple reflections which contaminate, for example, the ultrasound images at shallow depth (multiple echoes between the probe and the surface layers of the human body).

According to one or more exemplary embodiments, the characterization method further comprises:
- a step of determining, on the basis of said experimental reflection matrix, at least one second wideband focused reflection matrix, defined in a focused basis at input and at output, in a second spectral band different from said first spectral band;
- a step of determining at least one second distortion matrix defined in said second spectral band between said focused basis and said observation base, said second distortion matrix resulting, directly or after change of base, from the term-by-term matrix product of said second wideband reflection matrix, defined between said focused basis and said aberration correction base, with the phase conjugate matrix of a reference reflection matrix, defined for a model medium, between the same bases.

The distortion matrices defined on different spectral bands may be used to determine the same number of corrected reflection matrices which could then be summed in order to form a single wideband reflection matrix. This spectral analysis makes it possible to correct the chromatic aberrations caused by the frequency dispersion of the speed of sound in the medium. The plurality of distortion matrices obtained on different spectral bands could also be used to determine a spectral mapping of the speed of sound or of the multiple scattering rate.

The present description relates, according to a second aspect, to a system for the non-invasive ultrasound characterization of a heterogeneous medium configured to implement all of the exemplary ultrasound characterization methods as described above. The ultrasound characterization system according to the second aspect comprises:

At least one first array of transducers that is configured to generate a series of incident ultrasound waves in a region of said heterogeneous medium and to record the ultrasound waves backscattered by said region as a function of time;

a computing unit, coupled to said at least one first array of transducers, and configured to:
record an experimental reflection matrix defined between an emission basis at input and the transducer basis at output;
determine, on the basis of said experimental reflection matrix, at least one first wideband reflection matrix, defined in a focused basis at input and at output, in a first spectral band;
determine a first distortion matrix defined in said spectral band, between said focused basis and an observation base, said first distortion matrix resulting, directly or after change of base, from the term-by-term matrix product of said first wideband reflection matrix, determined between said focused basis and said correction base, with the phase conjugate matrix of a first reference reflection matrix, defined for a model medium, between the same bases;
determine, on the basis of said first distortion matrix, at least one mapping of a physical parameter of said heterogeneous medium.

The characterization system according to the present description may comprise at least one array of transducers both emitting and receiving, or a plurality of arrays of transducers, some being dedicated to the emission and others to the reception of the ultrasound waves.

BRIEF DESCRIPTION OF THE FIGURES

Other advantages and features of the technique presented above will become apparent from reading the detailed description below, provided with reference to the figures in which:

FIGS. 1A-1C (already described) illustrate known emission/reception mechanisms for ultrasound imaging and quantification;

FIG. 8 illustrates ultrasound images of a phantom without aberrations and with aberrations and the corresponding focused distortion matrices, determined at a given depth and corresponding to a line of the image;

In the various embodiments which will be described with reference to the figures, similar or identical elements bear the same references.

DETAILED DESCRIPTION

In the detailed description which follows, only some embodiments are described in detail in order to ensure clarity of the description, but these examples are not intended to limit the general scope of the principles that emerge from the present description.

The various embodiments and aspects described in the present description may be combined or simplified in multiple ways. In particular, the steps of the various methods may be repeated, reversed, or performed in parallel, unless otherwise specified.

Figure 4:
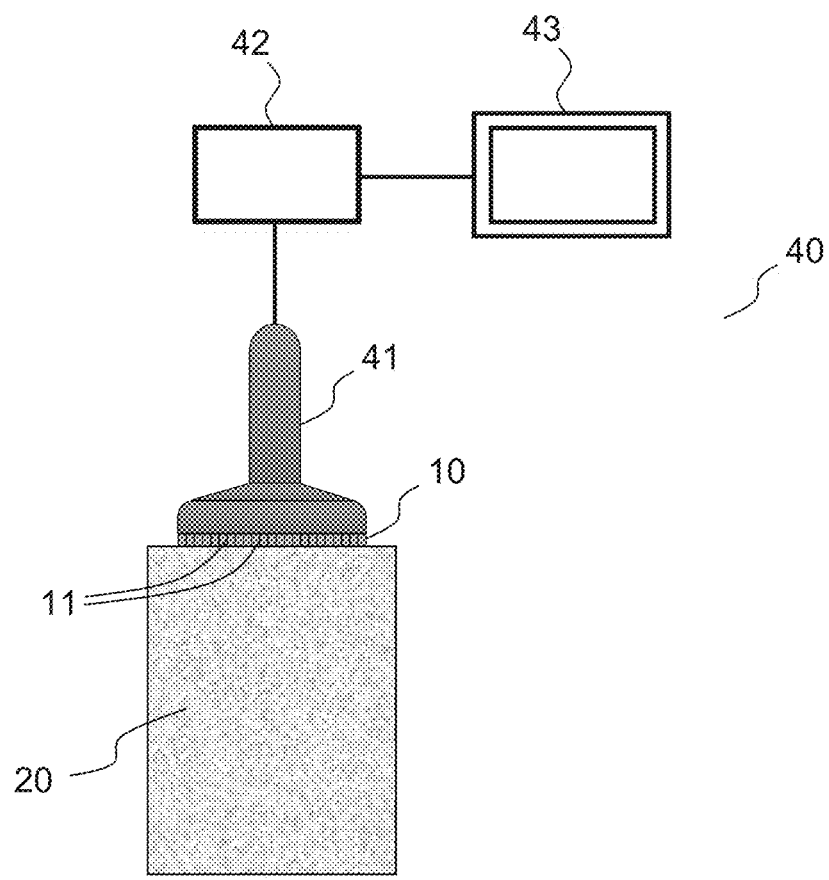
FIG. 4 illustrates an exemplary ultrasound characterization system for implementing the ultrasound characterization methods according to the present description.

FIG. 4 illustrates an exemplary ultrasound characterization system 40 for implementing the methods for the ultrasound characterization of a heterogeneous medium 20, according to the present description. The system 40 comprises at least one first array 10 of transducers 11, for example a linear or two-dimensional array; the transducers are, for example, ultrasound piezoelectric transducers which may take the conventional form of a rigid bar brought into contact with the medium 20. The array of transducers forms, for example, part of a probe device 41; the array of transducers is connected to a computing unit 42, which may itself be connected to a display device 43; the computing unit transmits and records electrical signals to/from each of the transducers 11. The ultrasound transducers then transform these electrical signals into ultrasound waves and vice versa. The computing unit 42 is configured for the implementation of calculating or processing steps, in particular for the implementation of steps of methods according to the present description.

In FIG. 4, as in the remainder of the description, reference is made to an array of transducers for emission and reception, it being understood that, in a more general case, a plurality of arrays of transducers could be used simultaneously. They may both emit and receive, or else only emit for some and only receive for others.

When, in the present description, reference is made to calculating or processing steps for the implementation in particular of method steps, it is understood that each calculating or processing step may be implemented by software, hardware, firmware, microcode or any appropriate combination of these technologies. When software is used, each calculating or processing step may be implemented by computer program instructions or software code. These instructions may be stored in or transmitted to a storage medium that is readable by a computer (or computing unit) and/or be executed by a computer (or computing unit) in order to implement these calculating or processing steps.

The various experimental results shown in the present description (FIGS. 5 to 15) were taken from two ultrasound phantoms, i.e. synthetic samples reproducing the mechanical properties of biological tissues (c=1540 m/s) and generating an ultrasound speckle characteristic of same. The first phantom makes it possible to quantify the performance of the imaging system in terms of resolution and contrast. Specifically, it comprises near-pointlike targets located at various depths and lateral positions and a heterogeneous echogenic inclusion 5 mm in diameter (FIGS. 5 to 10 and 12 to 15). The second phantom reproduces the shape and properties of breast tissue and exhibits bright echoes mimicking the presence of microcalcifications within same (FIG. 11).

Figure 5:
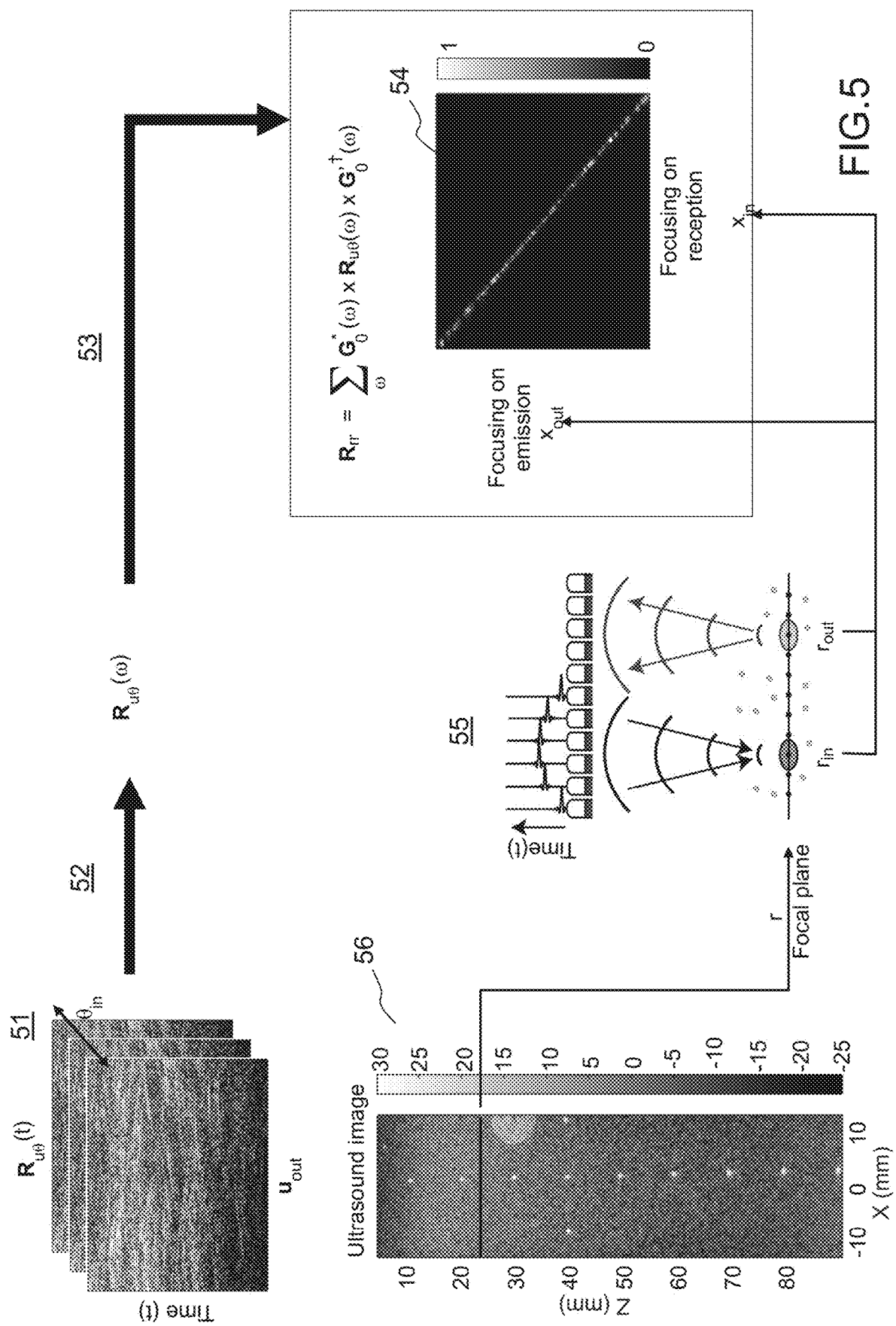
FIG. 5 illustrates one step of the method according to the present description, aiming to determine, according to one exemplary embodiment, a first wideband focused reflection matrix on the basis of an experimental reflection matrix.
Figure 6:
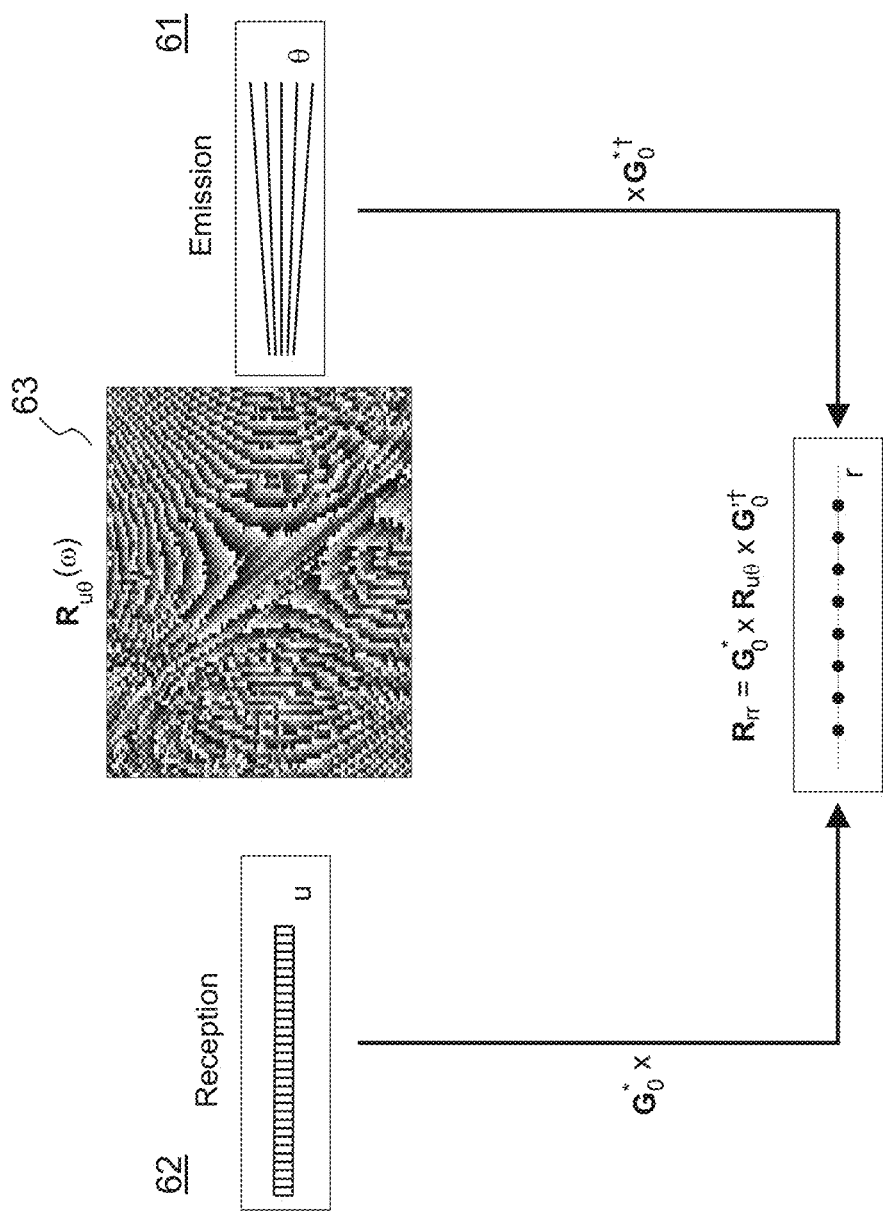
FIG. 6 illustrates the basis change matrix operations for the projection of reflection matrices recorded in the focused base.

The present description describes methods and systems for the non-invasive ultrasound characterization of a heterogeneous sample. These methods and systems are based on the determination of at least one first matrix called a "distortion matrix" in the remainder of the description. FIGS. 5 to 7 illustrate, according to some examples, steps of methods for determining the distortion matrix.

Figure 1B:
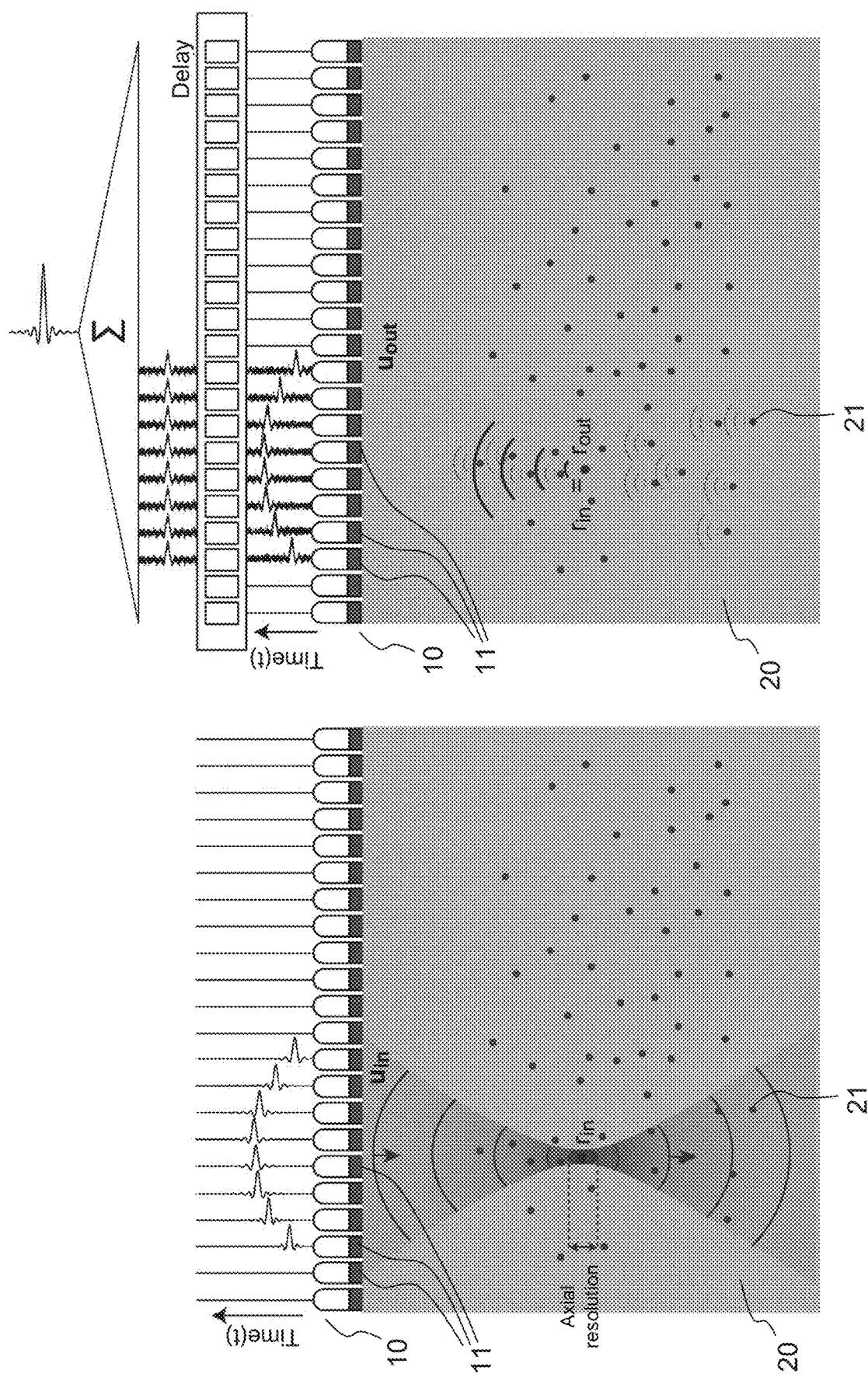
Figure 1C:
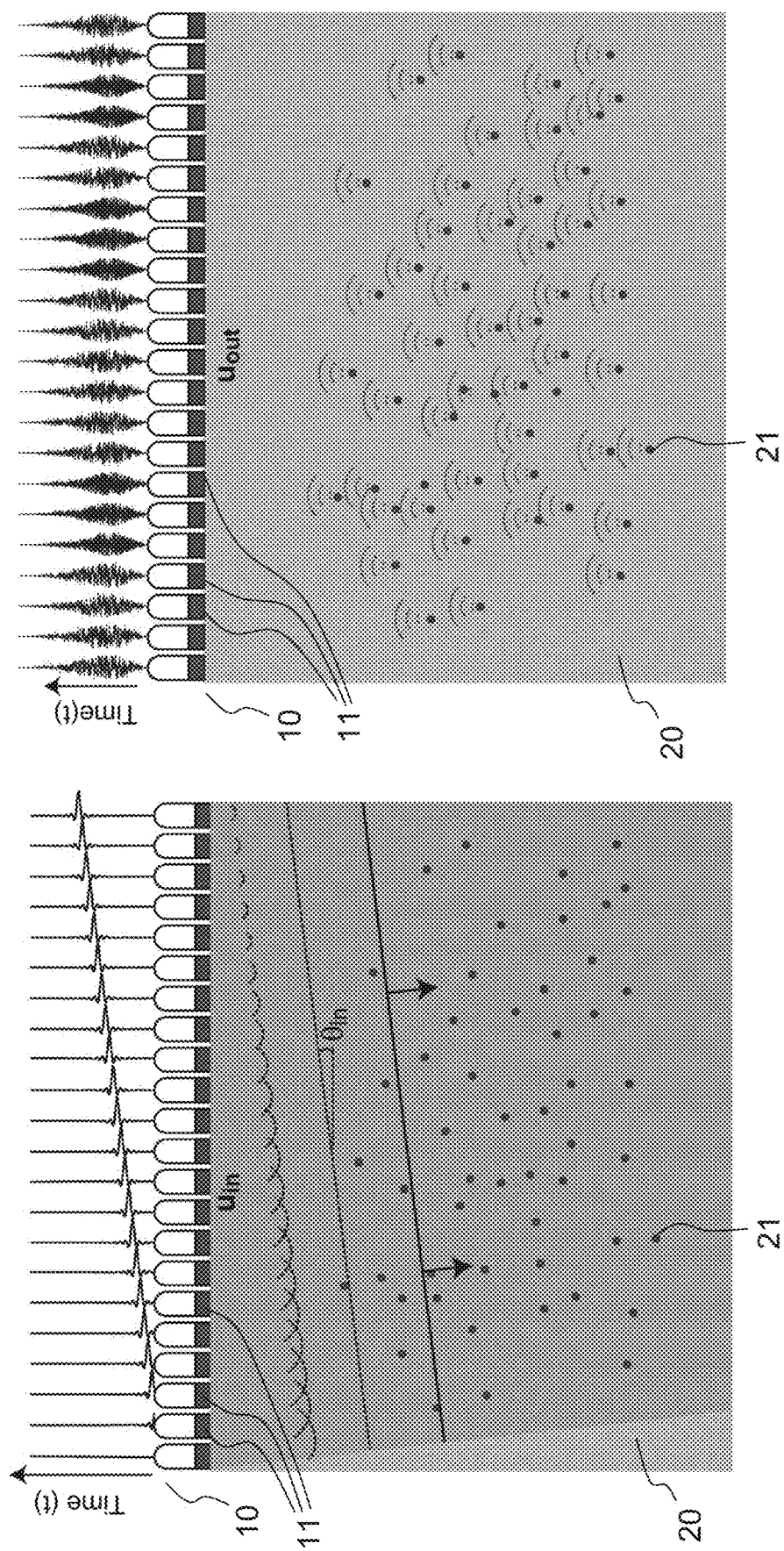

As illustrated in FIG. 5, step 51, the non-invasive ultrasound characterization method comprises a step of generating, by means of an array 10 of transducers 11 (FIG. 4), a series of incident ultrasound waves in a region of said heterogeneous medium and a step of recording an experimental reflection matrix $R_{ui}(t)$ defined between an emission basis i at input and the transducer basis u at output; the emission basis i at input is for example the transducer basis u, the plane wave basis θ or the focused basis r, as described by means of FIGS. 1A-1C. In the example of FIG. 5, it is for example an experimental reflection matrix $R_{uθ}(t)$ recorded between the plane wave basis at input and the transducer basis at output.

The method also comprises a step of determining, on the basis of said experimental reflection matrix $R_{ui}(t)$, at least one first wideband focused reflection matrix $R_{rr}(\Delta\omega_1)$, defined in a focused basis r at input and at output, in a first spectral band $\Delta\omega_1$. This step prior to the construction of the "distortion matrix" is illustrated according to one exemplary embodiment, by means of FIGS. 5 and 6.

In the example of FIG. 5, a discrete Fourier transform operation 52 makes it possible to express the experimental reflection matrix in the frequency domain $R_{uθ}(\omega)$. A step 53 of "wideband focusing" of the experimental reflection matrix comprises the projection of the reflection matrix $R_{uθ}(\omega)$ into the focal basis at input and at output in order to obtain a focused reflection matrix $R_{rr}(\omega)$, then a coherent summation on the spectral band $\Delta\omega_1$. A wideband focused reflection matrix is then obtained, an example of which is illustrated (image 54) at a given depth z.

FIG. 6 illustrates the projection of the reflection matrix $R_{uθ}(\omega)$ into the focal basis r at input and at output. By way of example, image 63 represents the phase of the matrix $R_{uθ}(\omega)$ at the frequency f=3.48 MHz, acquired in the first phantom, comprising near-pointlike targets and a heterogeneous echogenic inclusion of 5 mm in diameter, of which an ultrasound image is shown in FIG. 5 (image 56). This amounts to performing beamforming on emission (61) and on reception (62) in order to coherently sum the echoes coming from the same scatterer. Mathematically, these operations may be described using propagation matrices describing the outward and return paths of the waves in the medium. The transition from the incident plane wave basis to the focused basis is thus modeled by the matrix $G'_0(\omega) = [G'_0(r_{in}, \theta_{in}, \omega)]$, the elements of which are given by $$G'_0(r_{in}, \theta_{in}, \omega) = \exp[jk(z_{in} \cos \theta_{in} + x_{in} \sin \theta_{in})] \quad (1)$$

with $r_{in}=(x_{in}, z_{in})$ the position vector of the focus points in the medium, $\theta_{in}$ the angle of incidence of the emitted wave and $k=\omega/c$ the wavenumber. The path of the echoes reflected from the medium to the array of transducers may be described by the propagation matrix $G_0(\omega) = [G_0(r_{out}, u_{out}, \omega)]$, the elements of which are given by $$G_0(r_{out}, u_{out}, \omega) = \frac{\exp[jk\|u_{out} - r_{out}\|]}{\sqrt{k\|u_{out} - r_{out}\|}} \frac{z_{out}}{\|u_{out} - r_{out}\|} \quad (2)$$

with $r_{out}=z_{out}$) the position vector of the focus points in the medium and $u_{out}$ the position vector of the transducers. The last equation is a matrix translation of the |Rayleigh-Sommerfeld integral. Its first term is the 2D Green's function of the wave equation, or rather here its asymptotic form. The right-hand term is the direction cosine between the normal of the transducer array and the radial vector ($u_{out}-r_{out}$).

The operations of beamforming on emission and on reception may be interpreted as backpropagation of the echoes to the scatterers associated therewith. In the frequency domain, this translates as a phase conjugation of the propagation matrices. The focused reflection matrix $R_{rr}$ may thus be deduced from the experimental reflection matrix via the following matrix product:

$$R_{rr}(\omega) = G^*_0(\omega) \times R_{uθ}(\omega) \times G'^\dagger_0(\omega) \quad (3)$$

where the symbol × represents the matrix product and the exponent † denotes the conjugate transpose matrix. Of course, the projection of the reflection matrix into the focal bases at input and at output could also be carried out on the basis of an experimental reflection matrix expressed at input in another base, for example the transducer base. For this, it would be enough to use, in equation (3), the propagation matrix $G_0$ instead of the propagation matrix $G'_0$.

The next step consists in summing the reflection matrices obtained on the spectral band $\Delta\omega_1$ so as to obtain a wideband focused reflection matrix $$R_{rr}(\tau) = \Sigma_{f \in \Delta\omega_1} R_{rr}(\omega) e^{j\omega\tau} \quad (4)$$

τ is the echo time associated with the virtual array of transducers in the focused basis. Each coefficient $R(r_{out}, r_{in}, \tau)$ of the wideband focused reflection matrix corresponds to the analytical signal which would be recorded by the virtual transducer at $r_{out}$ immediately after the emission of a pulse from a virtual transducer at $r_{in}$ (diagram 55, FIG. 5). The diagonal of the matrix $R_{rr}(\tau=0)$ in ballistic time τ=0 corresponds to the confocal signal with focusing on emission and on reception on the same point. It therefore directly gives a line of the ultrasound image (image 56) if the focused basis is limited to a focal plane located at a distance z from the real array of transducers. If, however, the focused basis contains all of the focus points of the volume to be imaged, the diagonal of $R_{rr}(\tau=0)$ directly gives the entirety of the ultrasound image. In this latter case, the reflection matrix is a block matrix, only the diagonal blocks of which are non-zero. These correspond to the focused reflection matrices at each depth z of the medium. In the remainder of the description, in order to simplify the notation, the wideband reflection matrix will be called simply $R_{rr}$, there will no longer be any mention of the time τ because it will always be set at ballistic time τ=0. However, for some applications, in particular for the correction of high-order aberrations, the study of multiple scattering or the measurement of the speed of sound, the reflection and distortion matrices may also be examined at times τ≠0.

Figure 7A:
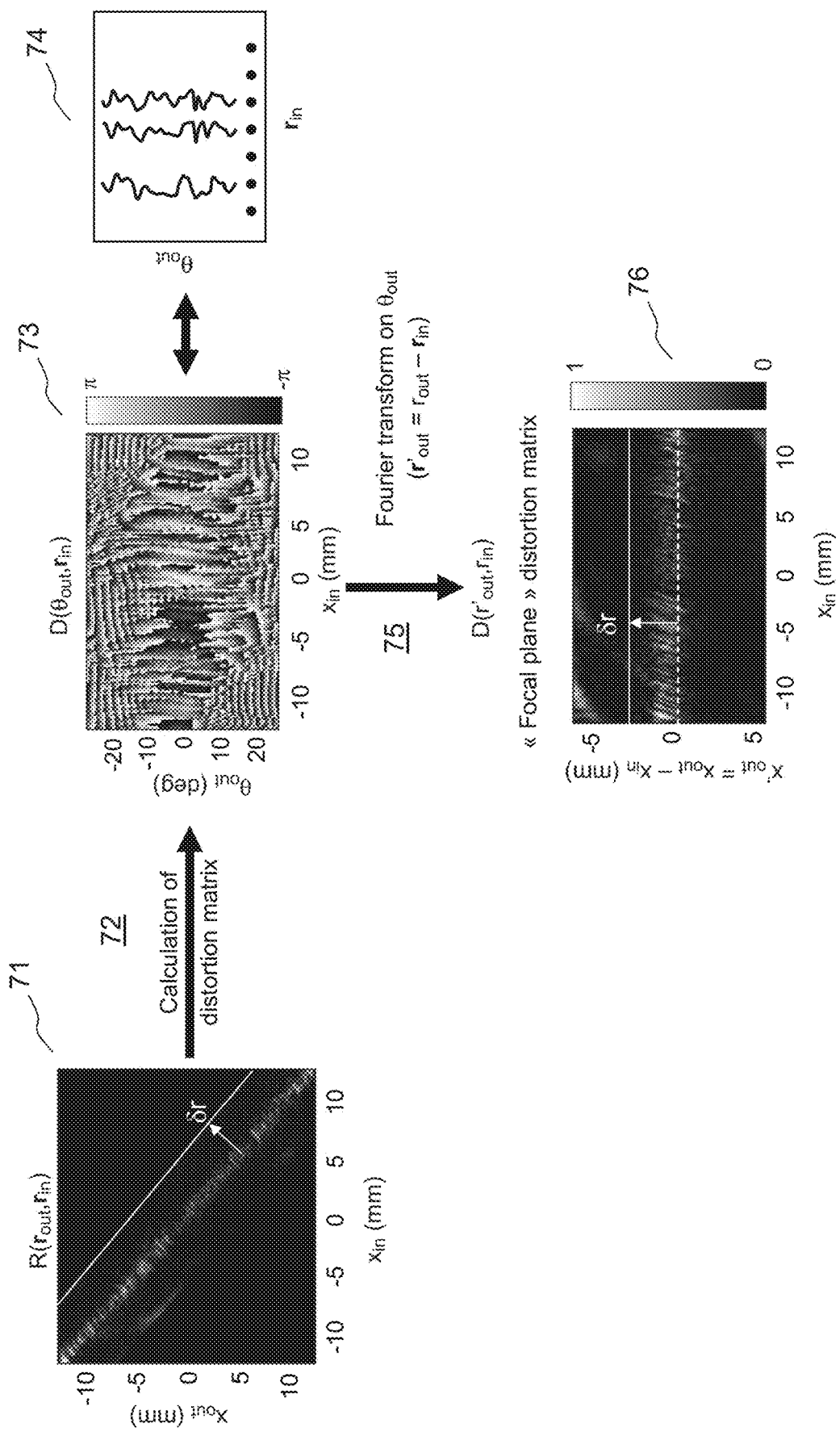
FIGS. 7A, 7B illustrate one step of the method according to the present description, aiming to determine, according to one exemplary embodiment, a first distortion matrix on the basis of the wideband focused reflection matrix.
Figure 7B:
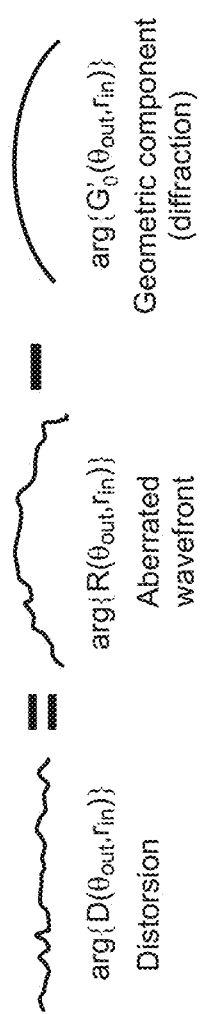

FIGS. 7A, 7B illustrate one step of the method according to the present description, aiming to determine, according to one exemplary embodiment, a first distortion matrix D on the basis of the wideband focused reflection matrix $R_{rr}$.

In order to estimate the aberrated component of the wavefronts, to start, an optimal basis for correcting the aberrations is chosen. For example, in the case of a thin aberrator located in proximity to the array of transducers, the transducer basis appears to be the most suitable. In the case chosen in this illustrative example of the characterization method, the heterogeneous medium is a translation invariant multilayer medium and the plane wave basis appears to be more suitable. This is for example the case with echography of the liver, where the sound waves have to pass through a succession of layers of muscle and adipose tissue. This example is considered hereinafter but the present description is in no way restricted to correction of aberrations from the Fourier base.

Image 71 (FIG. 7A) shows an example of a wideband focused reflection matrix $R_{rr}$ recorded in the presence of an aberration generated by the insertion of a layer of water (c=1480 m/s) 10 mm thick between the array of transducers and the phantom (c=1540 m/s). First, a change of basis of the reflection matrix $R_{rr}$ at output (or at input) into the plane wave basis makes it possible to form the wideband reflection matrix $R_{\theta r}$, such that $$R_{\theta r} = {}^t G'_0(\omega_c) \times R_{rr} \quad (5)$$

where the matrix $G'_0$ at the central frequency $\omega_c$ of the spectral band $\Delta v_1$ is considered. Physically, each row of the matrix $R_{\theta r}$ thus obtained corresponds to the wavefront backscattered in the far field for each insonified point $r_{in}$. Each wavefront has two components: a geometric component, linked to the diffraction of the wave between the transducer plane and the focal plane, and a distorted component, linked to the aberrations undergone by the wavefront going out and on return. In order to separate the two components, the matrix $R_{\theta r}$ is compared with a reference matrix that would be obtained in a model medium, for example a homogeneous medium without aberration (having only the geometric component). This reference matrix in the case of a homogeneous medium without aberrations is nothing other than the propagation matrix in a homogeneous medium $G'_0$. A new matrix is then created (FIG. 7A, step 72), called the distortion matrix in the present description, from the Hadamard product or term-by-term matrix product between said first wideband reflection matrix $R_{\theta r}$ determined between the focused basis and the aberration correction base, and the phase conjugate matrix of the reference reflection matrix, $G'^*_0(\omega_c)$, defined between the same bases at the central frequency $\omega_c$:

$$D_{\theta r} = R_{\theta r} \circ G'^{\dagger}_0(\omega_c) \quad (6)$$

where the symbol $\circ$ represents the term-by-term matrix product (Hadamard matrix product) and the exponent $\dagger$ denotes the conjugate transpose matrix. To recall, the elements of the phase conjugate matrix $G'^{\dagger}_0$ of the matrix ${}^tG'_0$ are complex numbers having the same modulus as those of ${}^tG'_0$ but being of opposite phase. In terms of matrix coefficients, this equation is written as:

$$D(\theta_{out}, r_{in}) = R(\theta_{out}, r_{in}) \times G'^*_0(r_{in}, \theta_{out}, \omega_c) \quad (7)$$

The operation performed above is illustrated by FIG. 7B. It consists in subtracting the deterministic geometric component from the measured wavefront and thus isolating its distorted component. Each column of the matrix $D_{\theta r}$ contains this aberrated component of the wavefront seen from the far field for each focus point $r_{in}$. Thus, in practice, to isolate the distorted component of the reflected wavefront, there is subtracted from the phase of the reflected field the phase of the field that would be obtained ideally in the absence of aberrations, for a model medium.

In the case of an inhomogeneous model medium, the expression of the reference reflection matrix $G'_0$ becomes more complicated than that given in equation (1). For example, in the case of a multilayer medium, the matrix $G'_0$ may be calculated analytically by a matrix product between the different transmission matrices associated with the propagation of the wave in each of the layers. For a more complicated model medium, typically one that is not translation invariant (e.g. curved interface), the matrix $G'_0$ may be determined by means of a numerical simulation or a semi-analytical calculation. Note that if the coefficients of the reference reflection matrix have an inhomogeneous modulus, the reference matrix may be normalized by imposing a constant modulus for each of these coefficients but retaining their phase.

Image 73 in FIG. 7A shows the phase of the distortion matrix $D_{\theta r}$ deduced from the reflection matrix, the modulus of which is shown in image 71. The latter corresponds to the line of the ultrasound image 83 (FIG. 8) produced on the phantom in the presence of an aberrating layer of water. Diagram 74 illustrates the isolated aberrated wavefronts for each point of the focal plane and the way in which they are stored in the distortion matrix.

The distortion matrix may also be studied in the focal plane. A "focal plane" distortion matrix $D_{rr}$ may be obtained on the basis of the distortion matrix expressed in the observation plane $D_{\theta r}$ via the following change of base:

$$D_{rr} = \hat{G}'^*_0(\omega_c) D_{\theta r} \quad (8)$$

where $\hat{G}'_0$ is a normalized propagation matrix, the elements of which are given by $$\hat{G}'_0(r'_{out}, \theta_{out}, \omega) = \frac{\hat{G}'_0(r'_{out}, \theta_{out}, \omega)}{\hat{G}'_0(r'_{out}=0, \theta_{out}, \omega)} = \exp[jkx'_{out}\sin\theta_{out}] \quad (9)$$

Equation (8) is therefore rewritten in terms of matrix coefficients as follows:

$$D(r'_{out}, r_{in}) = \Sigma_{\theta_{out}} D(\theta_{out}, r_{in}) \exp[-jk_c x'_{out} \sin\theta_{out}] = R(r_{out} - r_{in}, r_{in}) \quad (10)$$

where $k_c$ is the wavenumber at the central frequency $\omega_c$. In the present case where the aberration correction basis is the Fourier base, the focused distortion matrix $D_{rr}$ is simply deduced via spatial Fourier transform of $D_{\theta r}$ at output. However, it should be kept in mind that the relationship between the two matrices will be different [equation (8)] if the correction plane is no longer the Fourier plane.

The columns of $D_{rr}$, the modulus of which is shown in image 76, correspond to the field reflected in the image plane recentered on the focus point $r_{in}$. The matrix $D_{rr}$ therefore gives the change in the reflection spread function at each point of the ultrasound image, the spread function being the spatial impulse response of the imaging system, that is to say the focal spot recentered on the focus point. As will be described below, the spread function makes it possible to quantify and characterize the aberrations and the multiple scattering caused by the sample upstream of the focal plane.

By way of illustration, FIG. 8 illustrates an ultrasound image 81 of the phantom obtained without aberrations, by means of an experimental diagram recalled in diagram 80. Image 82 illustrates the focused distortion matrix determined at a given depth and corresponding to a line of image 81; image 83 is an ultrasound image of the phantom obtained in the presence of aberrations (aberrating layer of water 22, diagram 85) and image 84 illustrates the focused distortion matrix determined at a given depth and corresponding to a line of image 83. In the experiment without aberrations, all of the energy reflected by the medium appears on the central row of the distortion matrix ($r_{in}=r_{out}$): the width $\delta$ of the spread function is close to the limit imposed by diffraction ($\delta \sim \lambda z/D$, with D the size of the array of transducers) which explains the excellent quality of the ultrasound image in terms of resolution and contrast. However, in the presence of the aberrating layer of water, the energy reflected spreads outside of the central row. The degradation of the spatial impulse response implies a significantly less well resolved ultrasound image. This example shows how the "focal plane" distortion matrix makes it possible to quantify the quality of focusing in the medium, independently of a qualitative analysis of the ultrasound image.

To go further in the analysis of the distortion matrix $D_{\theta r}$, it is advantageously possible to consider, on the one hand, the case of a reflection by the sample that is mainly specular and, on the other hand, the case of a reflection that is mainly random scattering. In practice, it is often an intermediate case which combines random scattering reflection and specular reflection. In both cases, the distortion matrix $D_{\theta r}$ exhibits correlations between its columns. These correlations correspond to the repetition of the same distortion pattern for the wavefronts coming from the same isoplanatic domain. For a sample causing a random scattering reflection, for example of speckle type (random distribution of unresolved scatterers), it will be possible to study the normalized correlation matrix of the distortion matrix $D_{\theta r}$ in order to extract these same correlations more efficiently. Whichever the case, as will be described in more detail below, searching for the invariants of the matrix $D_{\theta r}$, for example by means of a singular value decomposition (SVD), makes it possible to extract the complex transmittance of the aberrator for each point of the focal plane and thus optimally correct the aberrations in each isoplanatic domain contained in the insonified region.

Assuming a sample causing random scattering reflection, examples of the use of the distortion matrix to determine a mapping of one or more aberration laws in the observation base, in particular to establish a mapping of the local reflectivity of the insonified region, are described below.

For this, the invariants of the distortion matrix are sought, in other words the aberration laws that are spatially invariant over the isoplanatic domains of the insonified region. Various methods are known to those skilled in the art for searching for the invariants of such a matrix, such as for example singular value decomposition (or "SVD") or principal component analysis ("PCA").

Singular value decomposition is a powerful tool for extracting the correlations between the rows or columns of a matrix. Mathematically, the SVD of the matrix $D\theta_r$, of size N×M, is written as follows:

$$D_{\theta r} = U \times \Sigma \times V^{\dagger} \quad (11)$$

U and V are unit matrices of size N×M, the columns $U_i$ and $V_i$ of which correspond to the output and input eigenvectors. Each output eigenvector $U_i$ is defined in the Fourier plane identified by the angle $\theta_{out}$. Each input eigenvector $V_i$ is therefore defined in the focal plane identified by the vector $r_{in}$. $\Sigma$ is a matrix of size N×M, only the diagonal elements of which are non-zero:

$$\Sigma = \text{diag}(\sigma_1, \sigma_2, \ldots, \sigma_{N^2}) \quad (12)$$

The diagonal elements of the matrix $\Sigma$ are the singular values $\sigma_i$ of the matrix $D_{\theta r}$ which are real, positive and ranked in descending order:

$$\sigma_1 > \sigma_2 > \ldots > \sigma_{N^2} \quad (13)$$

The coefficients $D(\theta_{out}, r_{in})$ of the matrix $D_{\theta r}$ are therefore written as the following sum:

$$D(\theta_{out}, r_{in}) = \sum_{i=1}^{L} \sigma_i U_i(\theta_{out}) V^*_i(r_{in}) \quad (14)$$

with L=min (M, N).

SVD primarily decomposes a matrix into two subspaces: a signal subspace (a matrix characterized by substantial correlations between its rows and/or its columns) and a noise subspace (a random matrix without correlation between its rows and columns). The signal subspace is associated with the largest singular values while the noise subspace is associated with the smallest singular values. On the one hand, the SVD of D will therefore make it possible to filter the noise subspace which contains both the experimental noise and the incoherent contribution of the reflected field caused by multiple scattering events. On the other hand, each singular state of the signal subspace will make it possible to extract, according to the output eigenvector $U_i$, the distortion undergone by the wave in the aberration correction basis for each isoplanatic domain of the image. In particular, in the case of a single isoplanatic domain, it is possible to show that the first output eigenvector $U_1$ directly gives the complex transmittance A of the aberrator between the correction plane and the focal plane:

$$U_1(\theta_{out}) = A(\theta_{out}) \quad (15)$$

The following figures illustrate various applications of the distortion matrix, whether defined in the focal bases or between the focal basis and the aberration correction base.

Figure 9B:
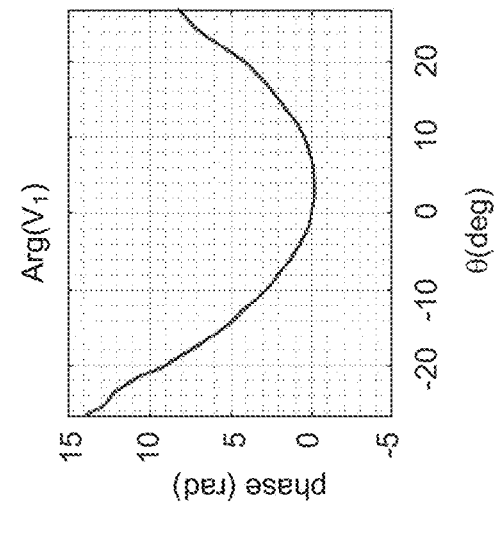
FIGS. 9A and 9B illustrate, respectively, the distribution of the singular values of the distortion matrix corresponding to the phantom with aberrations shown in FIG. 8 (FIG. 9A) and the phase of the associated first eigenvector in the Fourier plane (FIG. 9B)
Figure 9A:
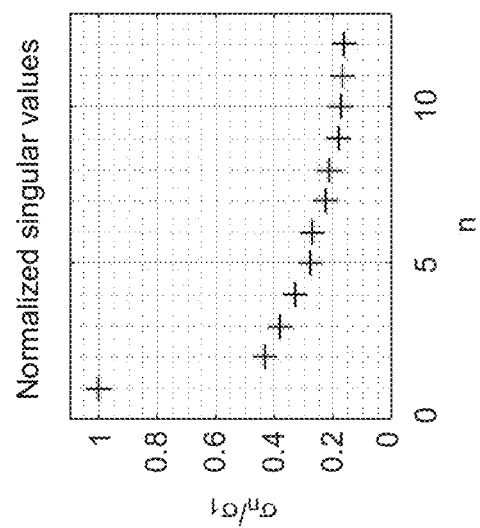

FIGS. 9A and 9B show the result of the SVD applied to the distortion matrix $D_{\theta r}$ shown in image 84 of FIG. 8. The spectrum of the singular values $\sigma_i$ of $D_{\theta r}$ (FIG. 9A) shows a dominance of the first singular value $\sigma_1$. This indicates the presence of a single isoplanatic domain. The associated first eigenvector $U_1$ (FIG. 9B) shows a parabolic phase, characteristic of a defocus defect explained by the presence of the layer of water in which the speed of sound (1490 m/s) is substantially different from that of the phantom (1540 m/s).

To correct the wideband reflection matrix $R_{rr}$ (71, FIG. 7A), to start, in this example, the matrix $R_{rr}$ is projected into the aberration correction plane (here the Fourier plane):

$$R_{\theta\theta} = {}^t G'_0(\omega_c) \times R_{rr} \times G'_0 \quad (16)$$

The aberrations are then corrected by applying the phase conjugate of $U_1$ at input and output of the matrix $R_{\theta\theta}$:

$$R'_{\theta\theta} = \exp(j \times \arg\{U^*_1\}) \circ R_{\theta\theta} \circ \exp(j \times \arg\{U_1^{\dagger}\}) \quad (17)$$

where $R'_{\theta\theta}$ is the corrected reflection matrix and the function arg{ . . . } denotes the phase of the vector between curly brackets. Relationship (18) translates for the matrix coefficients as follows:

$$R'(\theta_{out}, \theta_{in}) = U^*_1(\theta_{out}) R(\theta_{out}, \theta_{in}) U^*_1(\theta_{in}) \quad (18)$$

Physically, the phase conjugation operation consists in re-emitting a wavefront modulated by a phase opposite that of the measured distortion and in applying a similar correction at output. This operation then makes it possible to compensate perfectly for the phase distortions accumulated by the wave on its outward and return paths. A corrected matrix $R'_{rr}$ may then be deduced from $R'_{\theta\theta}$ via change of basis at input and output from the pupillary plane to the focal plane. A corrected confocal image I' may be deduced from the diagonal $(r_{in} = r_{out})$ of the matrix $R'_{rr}$:

$$I'(r_{in}) = R'(r_{in}, r_{in}) \quad (19)$$

$I'(r_{in})$ is then a reliable estimator of the reflectivity $\rho(r_{in})$ of the sample.

Figure 10:
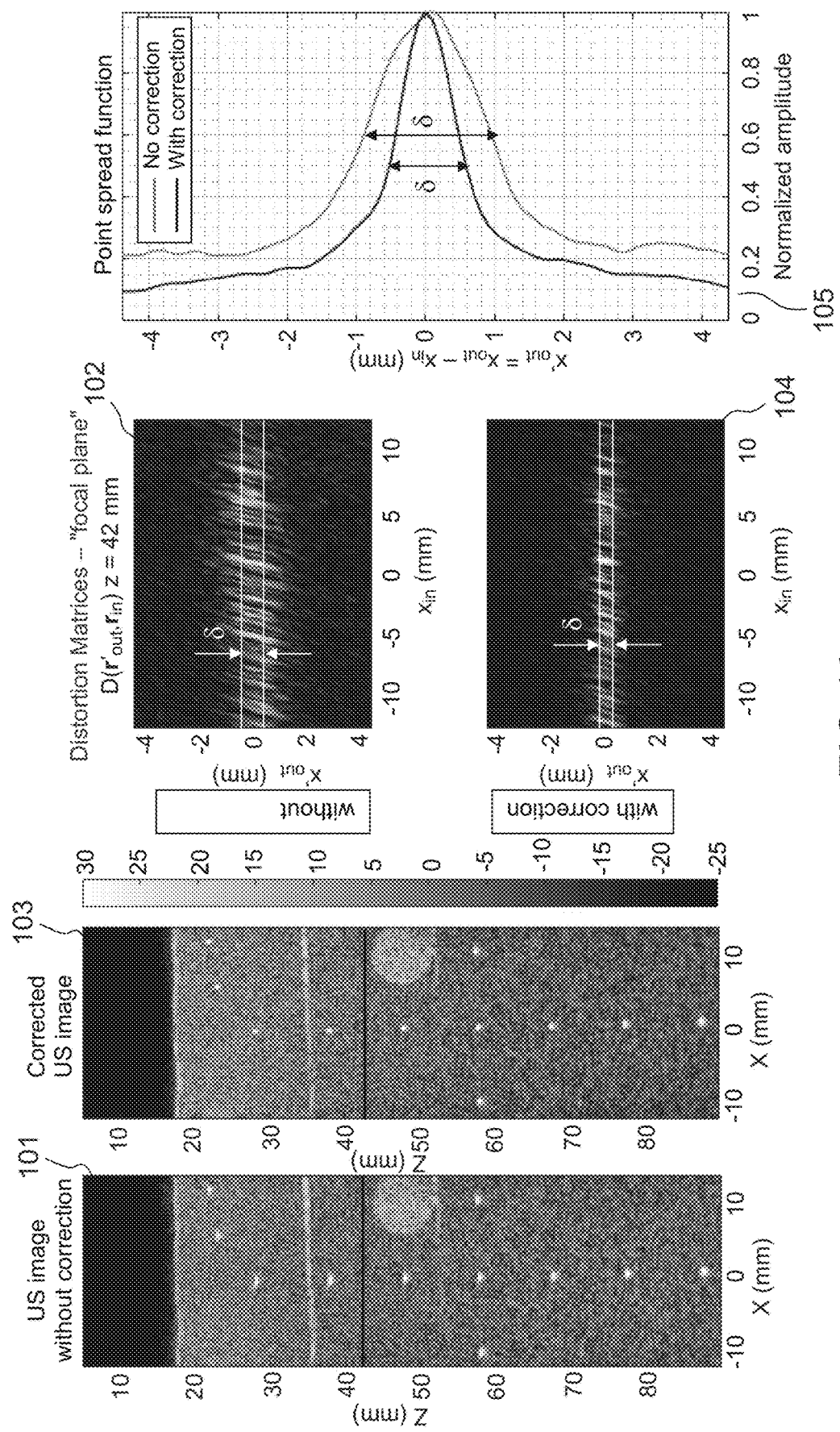
FIG. 10 illustrates an exemplary use of the distortion matrix (case of an aberrating layer of water on a phantom giving rise to a single isoplanatic domain) and more precisely illustrates ultrasound images without/with correction, the corresponding focused distortion matrices determined at a given depth and corresponding to a line of the image and a representation of the spread function with and without correction averaged over the insonified region and resulting from the focused distortion matrix.
Figure 11:
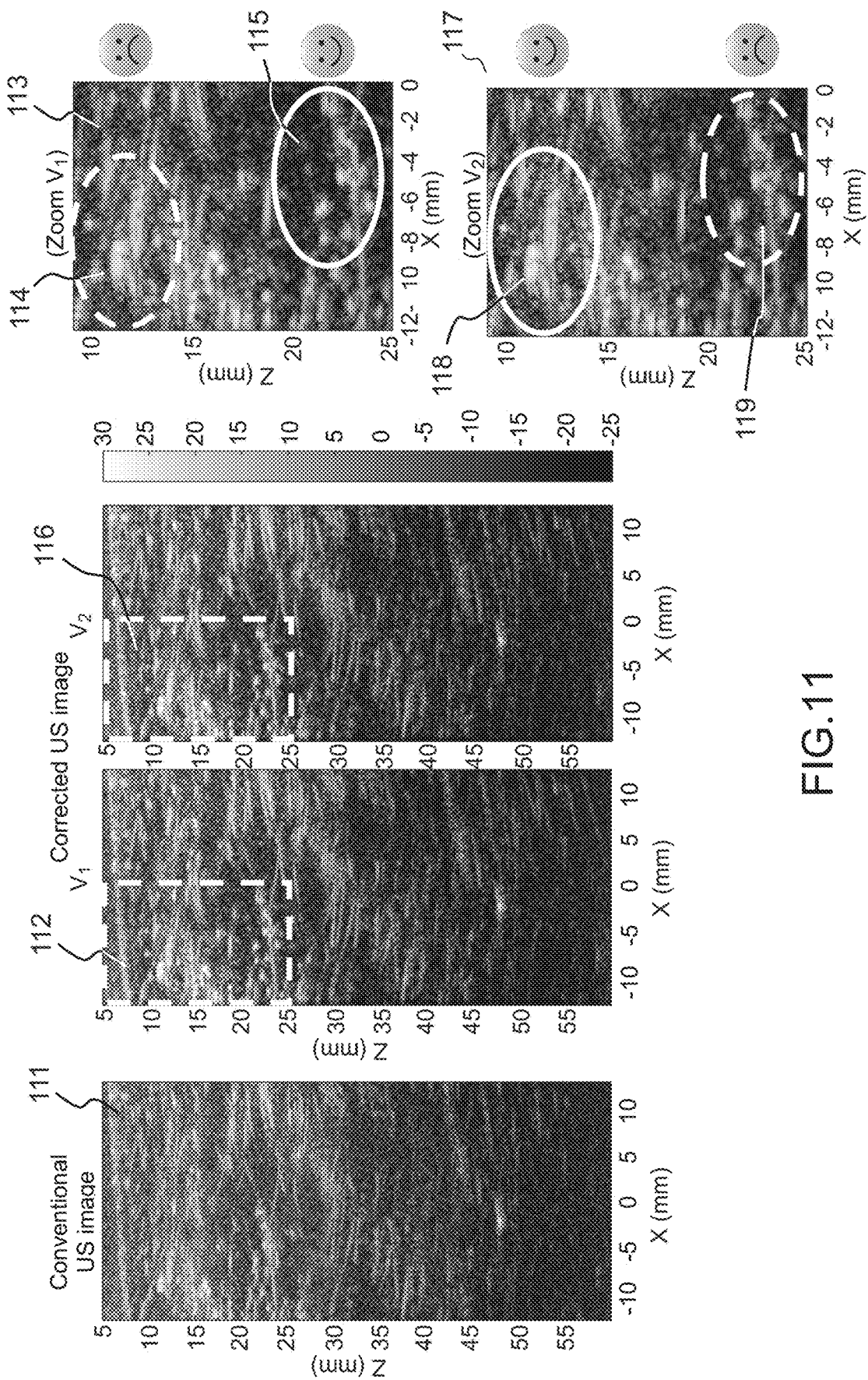
FIG. 11 illustrates an exemplary use of the distortion matrix (on a human breast phantom generating a plurality of isoplanatic domains) and more precisely illustrates a conventional ultrasound image and ultrasound images after correction of aberrations using the first vector of the distortion matrix and the second vector of the distortion matrix.
Figure 12:
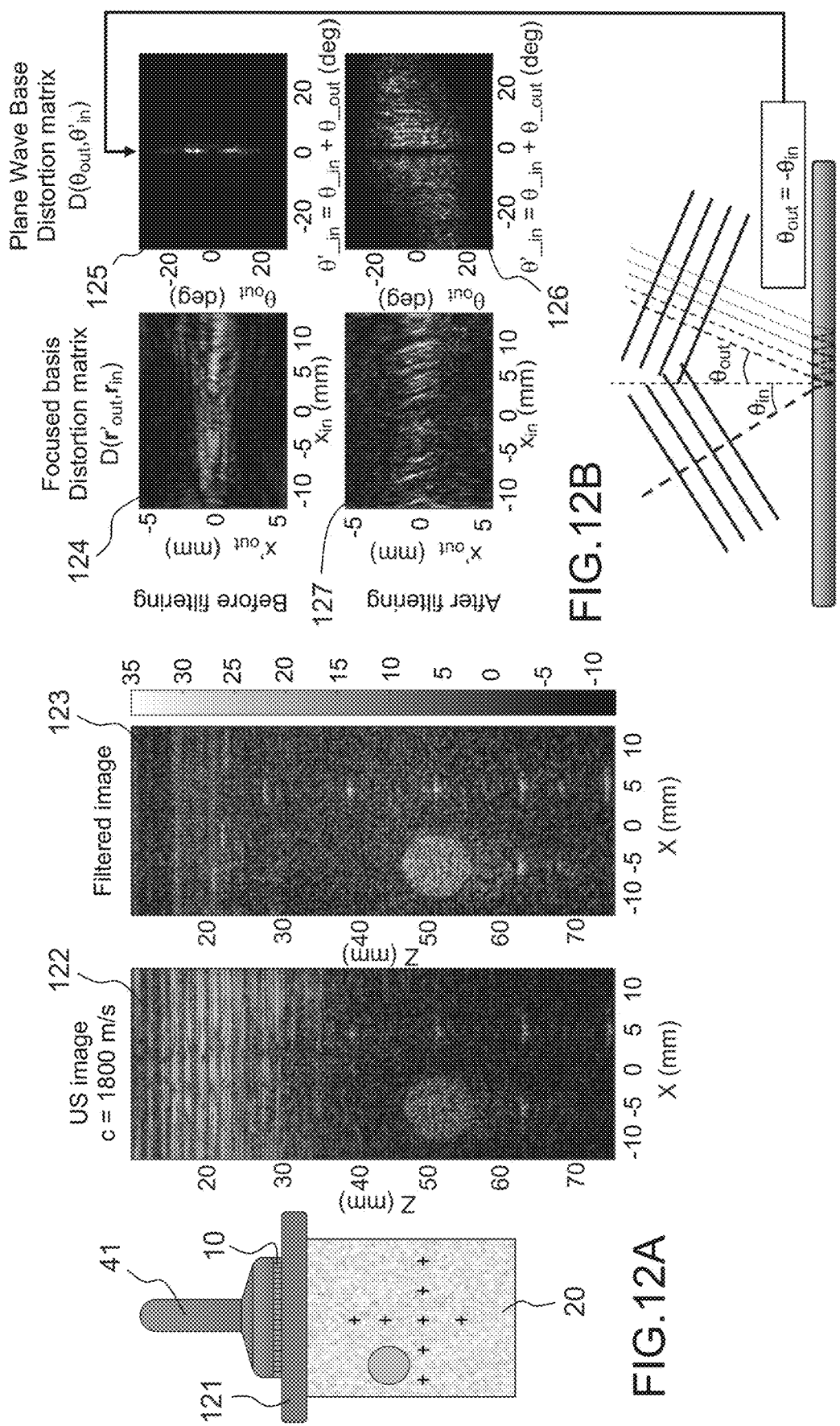
FIGS. 12A-12C illustrate an exemplary use of the distortion matrix for the filtering of multiple reflections and more precisely, FIG. 12A, a diagram describing the experimental setup (Plexiglas plate placed between the ultrasound probe and the phantom), FIG. 12B, an ultrasound image for a homogeneous speed model (c=1800 m/s), before and after removal of specular components and multiple reflections from the image, examples of a focused distortion matrix for one line of the ultrasound image, before and after filtering, the same distortion matrices projected into the plane wave base, and FIG. 12C, a diagram explaining the signature of the specular and multiple reflection components in the plane wave base.

FIG. 10 illustrates the benefits of this correction by comparing the aberrated ultrasound image 101 and the ultrasound image 103 obtained according to the correction described by equation (17). A qualitative gain between these two images is observed in particular by virtue of the echogenic targets which appear much more contrasted and better resolved after correction of the aberrations.

In echography, however, most of the time there are no echogenic targets for judging the resolution of the image. To quantify the latter, the focused distortion matrix may be used. That deduced from the starting reflection matrix, $D_{rr}$, is presented in image 102 at a particular depth. That deduced from the corrected reflection matrix, $D'_{rr}$, is presented in image 104 at the same depth. In the second case, the energy is much more concentrated around the central row of the focused distortion matrix than in the first case.

On the basis of the focused distortion matrix, it is also possible to determine the spread function. This corresponds to the spatial Fourier transform of the aberration law measured in the aberration correction plane. It is spatially invariant over each isoplanatic domain. It may also be obtained from the singular value decomposition of the focused distortion matrix. If the matrix $G'_0$ is unitary (which is the case if the Fourier and focused bases are conjugate with one another), then the matrix $D_{rr}$ has a singular value decomposition similar to $D_{\theta r}$. The output eigenvectors, which will be called $W_i$, are directly linked to the eigenvectors $U_i$ via a simple Fourier transform:

$$W_i = \hat{G}'^*_0(\omega_c) \times U_i \quad (20)$$

Diagram 105 of FIG. 10 compares the modulus of the spread functions thus obtained before and after correction. The gain in terms of resolution is obvious and the diffraction limit is reached after correction of the aberrations.

In the experiment performed, the measured aberrations are not dependent on the frequency since the speeds of sound in the phantom and in water vary little over the frequency band studied. In practice, this is not always the case and a frequency analysis of the distortion matrix may prove to be judicious in order to determine the space-frequency adaptive filter (or a space-time equivalent) that optimally corrects the aberrations. Specifically, the distortion matrix D may be studied on different spectral bands $\Delta\omega_i$ centered around distinct central frequencies $\omega_{c,i}$. An aberration law $U_1(\omega_{c,i})$ may be extracted on each of these spectral bands and a corrected reflection matrix $R'_{rr}(\omega_{c,i})$ may be deduced therefrom [equation (17)]. A coherent sum of the reflection matrices corrected independently on each of the spectral bands $\Delta\omega_i$ allows access to the ultra-wideband corrected reflection matrix $R'_{rr}$:

$$R'_{rr} = \Sigma_{\omega_{c,i}} R'_{rr}(\omega_{c,i}) \quad (21)$$

This frequency correction of aberrations is equivalent in beamforming to the convolution of the focused signals emitted and measured by the spatio-temporal filter $U_1(\tau)$, where $$U_1(\tau) = \Sigma_{\omega_{c,i}} U_1(\omega_{c,i}) e^{j\omega_c j\tau} \quad (22)$$

Up to this point, the case of a translation invariant aberrating layer has been used, thus generating only one isoplanatic domain. A second exemplary use of the distortion matrix is now described in the case of a volumic aberrator that is not translation invariant, thus generating a plurality of isoplanatic domains.

In this case, an iterative approach (post-processing) to the correction of aberrations is favored. Step #0 of the process consists in correcting the wideband reflection matrix $R_{\theta r}$ at output via the conjugate of the phase of the first eigenvector $U_1$ of the distortion matrix $D_{ur}$:

$$R_{\theta r}^{(1)} = \exp(j \times \arg\{U^*_1\}) \circ R_{\theta r} \quad (23)$$

where $R_{\theta r}^{(1)}$ is the resulting corrected matrix. This initial step makes it possible to perform an overall correction for aberrations over the entirety of the image.

Step #1 consists in recalculating a new distortion matrix $D_{ru}^{(1)}$ deduced from $R_{ru}^{(1)}$ defined this time between the Fourier plane at input and the focal plane at output. The random nature of the object means that it makes more sense to study the correlation matrix of $D_{ru}^{(1)}$ in the Fourier plane, namely $B^{(1)} = {}^T D_{r\theta}^{(1)} D_{r\theta}^{(1)*}$. A singular value decomposition of the phase of this matrix $B^{(1)}$, $\exp[j \arg\{B^{(1)}\}]$, gives a new set of eigenvectors $U_i^{(1)}$ that are associated with each isoplanatic domain of the image. The corresponding reflection matrix may therefore be corrected this time at input:

$$R_{r\theta}^{(2)} = R_{r\theta}^{(1)} \circ \exp(-j \arg\{U_i^{(1)}\}) \quad (24)$$

The following steps consist in reproducing the same process by alternately correcting for residual aberrations at output (even iterations) and input (odd iterations). However, in each step, the correction is still performed with the first eigenvector $U_1^{(n)}$ of the phase of the correlation matrix, $\exp[j \arg\{B^{(n)}\}]$, of the distortion matrix in the pupillary plane. Specifically, the choice of isoplanatic domain is made in step #1. Depending on whether the correction is at output or at input, the correlation matrix in the pupillary plane $B^{(n)}$ is given by: $B^{(n)} = D_{\theta r}^{(n)} D_{\theta r}^{(n)\dagger}$ for even n (output) and $B^{(n)} = {}^T D_{r\theta}^{(1)} D_{r\theta}^{(1)*}$ for odd n (input). In each step of the process, an image of the field of vision may be deduced from the diagonal of the reflection matrix $R_{rr}^{(n)}$ expressed in the focal plane. In practice, a few iterations are sufficient to obtain an optimal correction for the selected isoplanatic domain. An image of the entirety of the field of vision may then be obtained by combining the corrections determined for each isoplanatic domain.

FIG. 11 illustrates the benefits of the method according to the present description by means of an experiment on a breast phantom generating a plurality of isoplanatic domains and comprising microcalcifications at a depth of between 20 and 25 mm FIG. 11 shows a conventional ultrasound image 111, an ultrasound image 112 after correction of aberrations using the first eigenvector $U_1^{(1)}$ of the normalized correlation matrix $\exp[j \arg\{B^{(1)}\}]$, and a closeup 113 on part of the preceding ultrasound image. Also shown is an ultrasound image 116 after correction of aberrations using the second vector $U_2^{(1)}$ and, in image 117, a closeup on part of the preceding ultrasound image. It can be seen from these images that the first eigenvector $U_1^{(1)}$ is associated with the isoplanatic domain containing the microcalcifications at a depth of between 20 and 25 mm Specifically, the ultrasound image (112) is more contrasted and better resolved at this depth. Conversely, the second eigenvector $U_2^{(1)}$ optimally corrects image (117) at shallower depths (between 10 and 15 mm).

Figure 2:
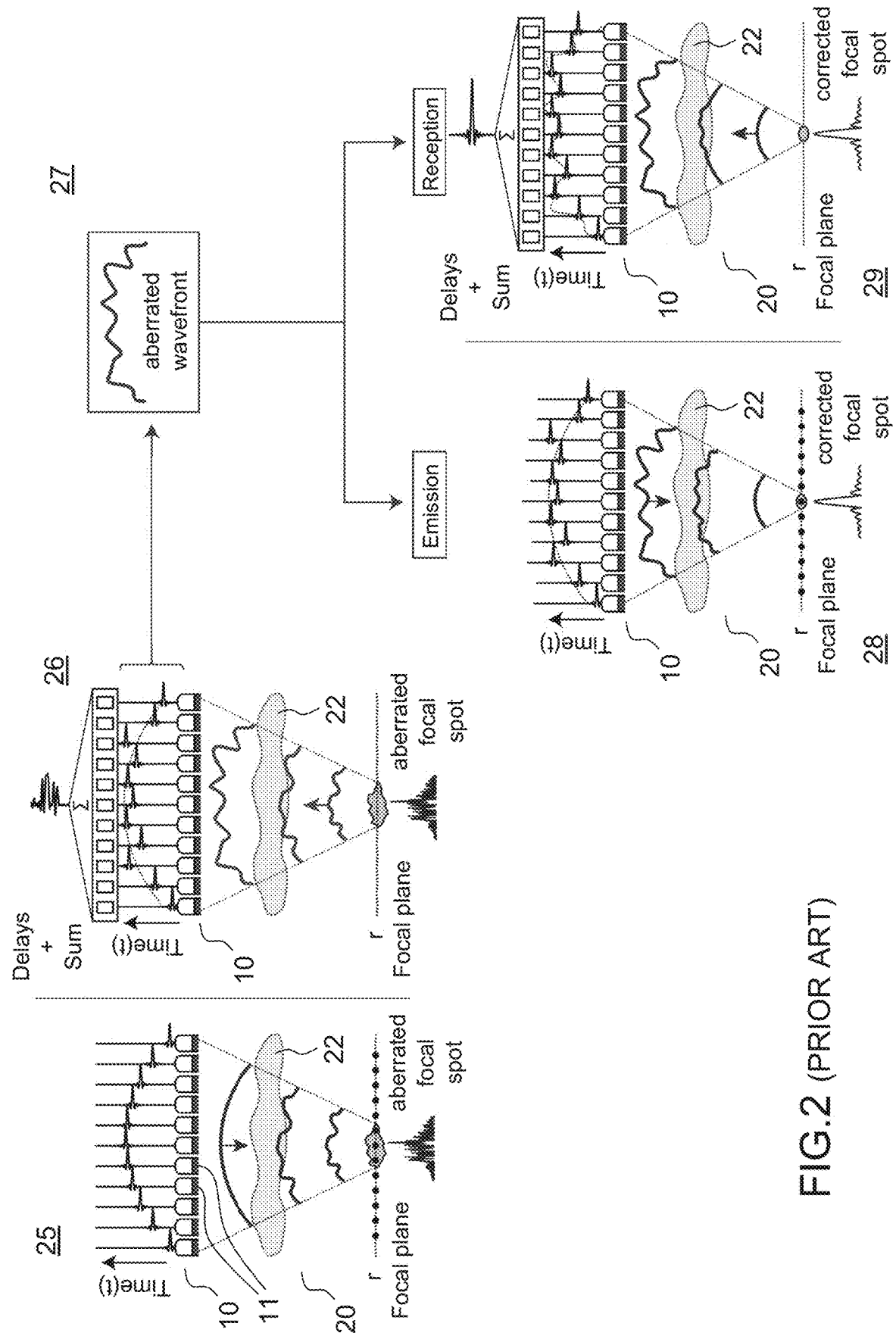
FIG. 2 (already described) illustrates a technique for correcting aberrations in ultrasound imaging, according to the prior art, based on adaptive focusing.
Figures 3A, 3B:
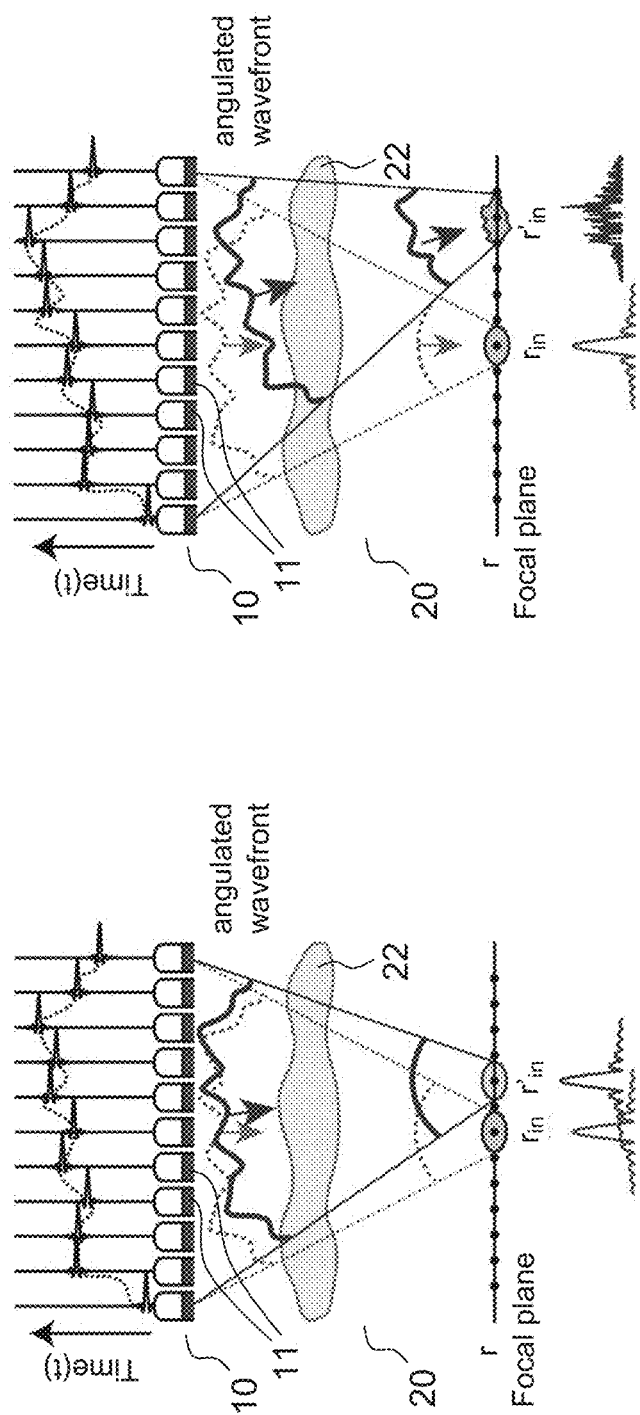
FIGS. 3A-3B (already described) schematically illustrate the concept of isoplanatic domains.

Knowledge of the aberration laws at each point of the sample may be put to good use not only for imaging but also for physically focusing the ultrasound waves at any point of the sample. For example, on the experimental device of FIG. 2, it may be a matter of applying, to the array of transducers, a convolution of the initial focused signal via a spatio-temporal filter deduced from the eigenvectors of the distortion matrix. In the presence of a single isoplanatic area, it will be a matter of considering the Fourier transform of the first eigenvector $U_1$ [equation (22)]. Note that if the aberration law is frequency stable, the spatio-temporal filter will simply consist in applying a delay law $\Delta t$ that is directly proportional to the phase of the eigenvector $U_1$ in the transducer base $$\Delta t(u) = -\arg\{U_1(u)\}/\omega_c \quad (25)$$

In the presence of a plurality of isoplanatic areas, the aberration laws are determined by means of an iterative process (see previous paragraph). It will be a matter of bringing together, according to a vector W, all of the aberration corrections obtained at input of the sample:

$$W = \exp(-j[\arg\{U_i^{(1)}\} + \Sigma_{n=1} \arg\{U_1^{(2n+1)}\}]) \quad (26)$$

In specular reflection mode and in the case of an ultrasound image contained in a single isoplanatic domain, it is possible to show that the first output eigenvector $U_1$ of the distortion matrix gives the distortion caused by the aberrator cumulatively going out and on return:

$$U_1(\theta_{out}) = A(\theta_{out}) A(\theta_{in}) \delta(\theta_{out} + \theta_{in}) \quad (27)$$

with $A(\theta_{out})$ and $A(\theta_{in})$ the distortions undergone by the wavefront going out and on return and projected into the Fourier plane. The Dirac distribution $\delta$ in the preceding equation reflects the fact that, in specular reflection mode, a plane wave with an angle of incidence $\theta_{in}$ is reflected as a plane wave at an angle $\theta_{out} = -\theta_{in}$ at output. Additionally, it is possible to show that the input eigenvector $V_1$ gives, for its part, direct access to the reflectivity $\rho$ of the object:

$$V_1(r_{in}) = \rho(r_{in}) \quad (28)$$

The reflection matrix may be corrected for aberrations by applying thereto, only once at input or output, the phase conjugate of the eigenvector $U_1$:

$$R'_{ur} = \exp(-j \times \arg\{U_1\}) \circ R_{ur} \quad (29)$$

In the case of an ultrasound image containing a number P>1 of isoplanatic domains, the distortion matrix is of rank P. The input eigenvectors $V_i$ decompose the object in the focal plane over different isoplanatic domains and are associated with different aberration laws $U_i$ in the Fourier plane. The linear combination of the moduli of the eigenvectors $V_i$ weighted by the associated eigenvalues $\sigma_i^2$ finally gives access to an image of the field of vision corrected for the aberrations caused upstream $$|\rho(r_{in})|^2 = \Sigma_{i=1}^P \sigma_i^2 |V_i(r_{in})|^2 \quad (30)$$

However, a reflector is never perfectly specular and its random scattering component will therefore not be corrected optimally by equation (29). Furthermore, a specular reflector may cause multiple reflections between its interfaces which may blur the ultrasound image. It is therefore necessary to be able to separate the specular and random scattering components of the field reflected by the medium. According to one or more exemplary embodiments, the characterization method therefore also comprises the identification and/or elimination of the specular component of the reflected field and/or of the multiple reflections arising between the array of transducers and the various interfaces or layers of the heterogeneous medium. To this end, the distortion matrix may be projected into the aberration correction basis both at input and at output. A "Fourier plane" distortion matrix $D_{\theta\theta}$ may be obtained on the basis of the distortion matrix expressed in the observation plane $D_{\theta r}$ via the following change of base:

$$D_{\theta\theta} = D_{\theta r} {}^t G'_0(\omega_c) \quad (31)$$

The previous equation is therefore rewritten in terms of matrix coefficients as follows:

$$D(\theta_{out}, \theta'_{in}) = \Sigma_{r_{in}} D(\theta_{out}, r_{in}) \exp[jk(z_{in} \cos \theta'_{in} + x_{in} \sin \theta'_{in})] = R(\theta_{out}, \theta_{in} + \theta_{out}) \quad (32)$$

As illustrated in FIG. 13C, the specular and multiply reflected components appear for precise reflected and incident angle pairs, $\theta_{in}$ and $\theta_{out}$, such that $$\theta_{in} + \theta_{out} = \Delta\theta \quad (33)$$

where $\Delta\theta$ corresponds to the angle between the specular reflector and the array of transducers. $\Delta\theta$. It is for example zero if the specular reflector is parallel to the array of transducers. The specular and multiply reflected components may therefore be easily filtered and just the random scattering component (speckle) of the reflected field may be retained in order to precisely determine the aberrations caused by the Plexiglas plate and correct them. This discrimination of the random scattering component then allows direct access to the aberration laws to be applied at input and output in order to correct the reflection matrix and obtain an optimal image of the medium [equation (17)], which is not possible if the specular component predominates [equation (29)]. In addition, the filtering of the distortion matrix in the Fourier plane makes it possible to eliminate the multiple reflections which contaminate, for example, the ultrasound images at shallow depth (multiple echoes between the probe and the surface layers of the human body).

FIGS. 12A-12C illustrate the use of the distortion matrix for the filtering of multiple reflections and its subsequent application to aberration correction and mapping the speed of sound. FIG. 12A shows the diagram of the experimental setup, namely a Plexiglas plate 121 placed between the ultrasound probe 41 and the phantom 20. The corresponding ultrasound image 122 is constructed using a homogeneous speed model (c=1800 m/s). This image is strongly degraded by the multiple reflections and the aberrations caused by the Plexiglas plate. FIG. 12B shows various forms of the distortion matrix for a depth of the ultrasound image (z=25 mm). Image 124 shows the modulus of the focused distortion matrix with a spread function that is particularly degraded by the presence of the Plexiglas plate. Image 125 shows the distortion matrix in the Fourier plane. A strong specular component for $\theta_{in} + \theta_{out} = 0$ is clearly apparent. Image 126 shows the same distortion matrix after application of a specular filter which consists in eliminating all of the components of the field for which $|\theta_{in} + \theta_{out}| < 1/60$ rad. Image 127 shows the focused distortion matrix after filtering of the specular component. Comparison with image 126 (before filtering) shows a distortion matrix, which while still strongly aberrated, has a random appearance typical of the random scattering mode (speckle). The central row of the distortion matrices thus filtered gives the ultrasound image 123 of FIG. 12A. Comparison with the raw ultrasound image 122 shows that the applied filter has succeeded in successfully eliminating the multiple reflections caused by the Plexiglas plate. Even though image 123 is still subject to aberrations, each of the targets of the phantom is now visible, which was not the case in the initial image 122.

According to one or more exemplary embodiments, the determination of at least one mapping of a physical parameter of said heterogeneous medium comprises determining the speed of sound in the insonified region. This involves studying, for example, the change in the first singular value of the distortion matrix as a function of the speed model used to model the reference matrix. The optimal speed model is that which maximizes the first singular value of the distortion matrix. An alternative is to study the focused distortion matrix. Specifically, this makes it possible to study the change in the spread function as a function of the speed model used for the calculation of the reference matrix. The optimal speed model is that which minimizes the width of the wavelength-normalized spread function.

Figure 13:
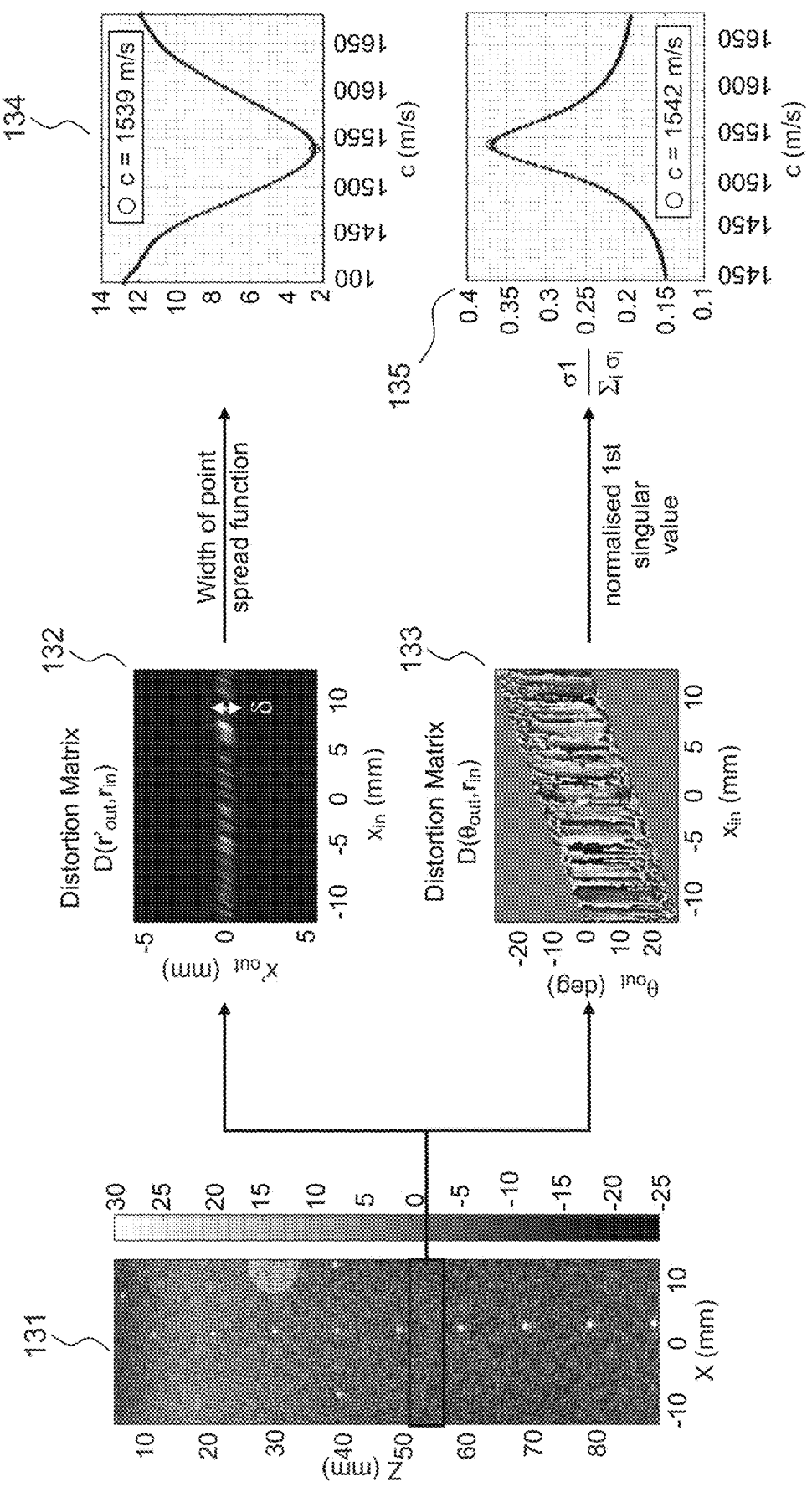
FIG. 13 illustrates an exemplary use of the distortion matrix for a quantitative measurement of the speed of sound and illustrates more precisely an ultrasound image of the phantom studied, an example of a focused distortion matrix for a line of the image and a homogeneous speed model (c=1540 m/s), the corresponding distortion matrix between the focal plane at input and the Fourier plane, the width of the spread function normalized by the wavelength as a function of the speed of the waves c, the normalized first singular value of the distortion matrix as a function of this same speed.

Thus, FIG. 13 illustrates exemplary use of the distortion matrix for quantitative measurement of the speed of sound.

FIG. 13 shows the ultrasound image 131 of the phantom already shown in image 81 (FIG. 8) in the absence of aberrations. Image 132 shows an example of a focused distortion matrix for a line of the image and a homogeneous speed model (c=1540 m/s) and image 133 shows the corresponding distortion matrix between the focal plane at input and the Fourier plane. Diagram 134 illustrates the width δ of the spread function normalized by the wavelength λ as a function of the speed of the waves c, and diagram 135 shows the normalized first singular value, $\bar{\sigma}_1 = \sigma_1/\Sigma_{i=1}^{N}\sigma_i$, of the distortion matrix as a function of this same speed.

The ratio δ/λ in diagram 134 clearly shows at least around c=1539 m/s while the speed given by the phantom maker is 1540 m/s. An adequate speed model implies optimal focusing of the ultrasound waves on emission and on reception and a spread function which is correspondingly better resolved. The focused distortion matrix therefore provides a relevant criterion for quantitative measurement of the speed of sound in the phantom. Likewise, the first singular value $\bar{\sigma}_1$ of the distortion matrix in diagram 135 shows a maximum around a speed c=1542 m/s. Here again, the measured speed is close to that given by the maker. Specifically, the closer to reality the speed model used to calculate the distortion matrix is, the closer the distortion matrix is to a singular matrix of rank 1. This experiment shows how the distortion matrix offers various criteria for quantitative measurement of the speed of sound. Here, for proof of concept, it is limited to the case of a homogeneous medium but, of course, it is potentially possible to use the distortion matrix and its parameters δ/λ or $\bar{\sigma}_1$ as information feedback in order to construct a local mapping of the speed of sound in the medium. A first step for this will be presented in FIG. 14.

Beyond the reflectivity of the medium or knowledge of the aberration laws at each point of a sample, the distortion matrix makes it possible to perform 3D tomography of the optical index of the sample studied. From the "focal plane" distortion matrix $D_{rr}$, there is access to the spread function in the sample as well as to the isoplanatic domains. Instead of directly correcting the images, the idea is to change the reference medium on which is based the calculation of the distortion matrix from the reflection matrix. This leads to an iterative approach to the distortion matrix in which the reference medium is made to change in the direction of a more complex model (e.g. multilayer medium) so as to decrease the spatial extent of the spread function and increase the size of the isoplanatic domains. By going deeper and deeper into the sample, it is possible to gradually reconstruct a three-dimensional map of the speed of sound, while obtaining an image of the reflectivity of the medium that is all the more faithful the closer the reference medium is to reality.

Figure 14:
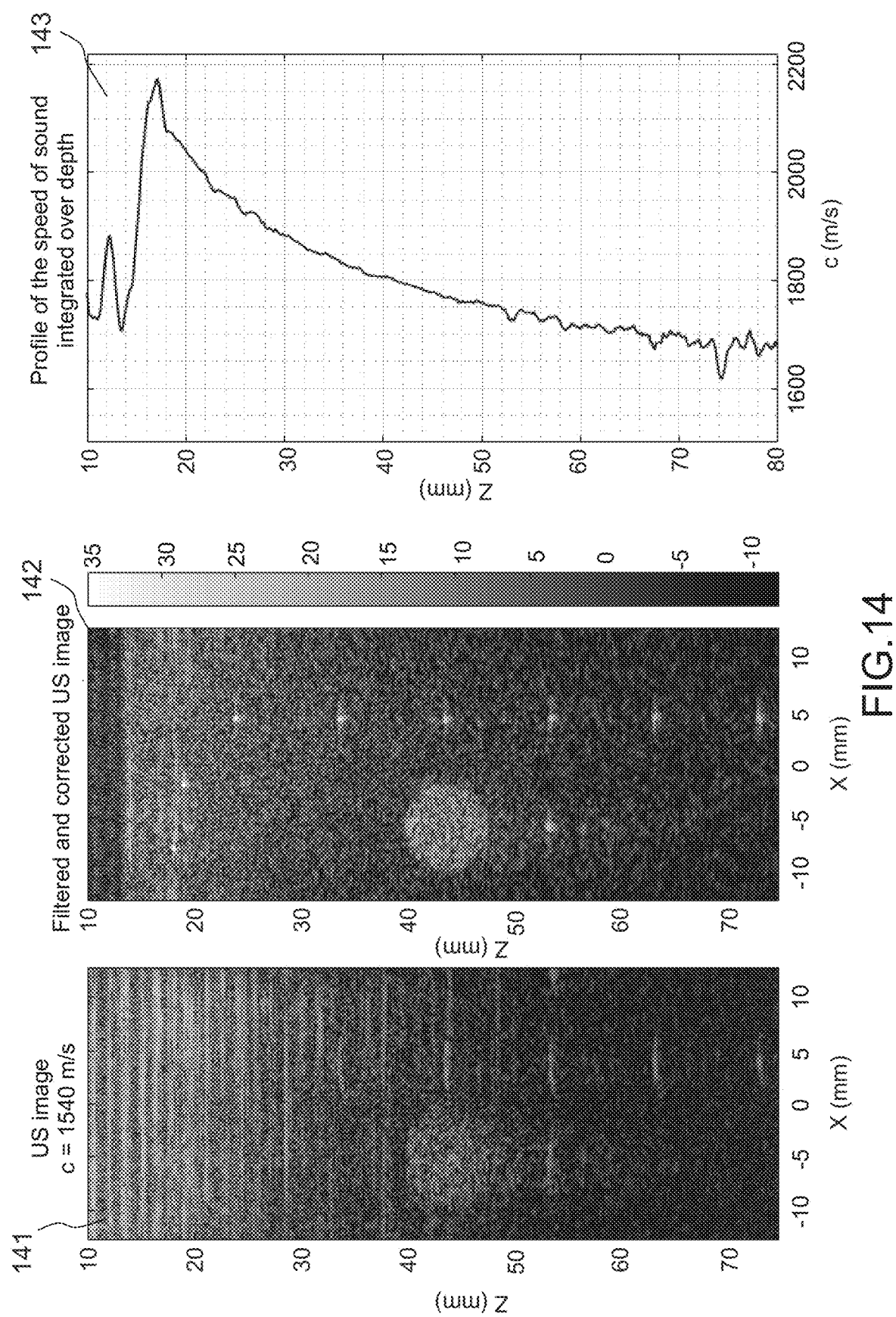
FIG. 14 illustrates an exemplary use of the distortion matrix for establishing a mapping of the speed of sound in the medium and more precisely illustrates a conventional ultrasound image of the phantom through the Plexiglas plate for a homogeneous speed model (c=1540 m/s), and the same image after filtering multiple reflections and optimizing the speed model for each line of the image, the profile of speed of sound integrated over depth.

FIG. 14 illustrates an exemplary use of the distortion matrix for establishing a mapping of the speed of sound in the medium. FIG. 14A shows a conventional ultrasound image 141 of the phantom through the Plexiglas plate for a homogeneous speed model (c=1540 m/s). This ultrasound image is of poor quality, due to the aberrations and multiple reflections caused by the Plexiglas plate. By contrast, the reflectivity of the phantom is successfully revealed in ultrasound image 142. The latter was constructed first by filtering the multiple reflections in the image (FIG. 12) and then by optimizing the speed model for each line of the image (FIG. 13). These operations make it possible to obtain an optimum resolution only limited by diffraction. Only the low spatial frequencies of the targets are poorly recombined due to the filtering of the specular component. Diagram 143 shows the profile obtained for the speed of sound integrated over depth. This speed increases sharply on entering the Plexiglas layer (z=14 mm) before gradually decreasing as it leaves (z=17 mm). An algorithm then makes it possible to solve the inverse problem consisting in deducing from this integrated speed profile the exact profile of the speed of sound as a function of depth. The speed of sound measured in the Plexiglas is 2700 m/s and that in the phantom is, as expected, 1540 m/s.

According to one or more exemplary embodiments, the determination of at least one mapping of a physical parameter of said heterogeneous medium comprises determining a multiple scattering rate in the insonified region. This involves studying, for example, the focused distortion matrix for which aberrations will have been corrected beforehand. The ratio of the average of the incoherent intensity (multiple scattering) obtained beyond the focal spot to the intensity at the focus point (central row of the distortion matrix) gives access to a local multiple scattering rate.

Figure 15:
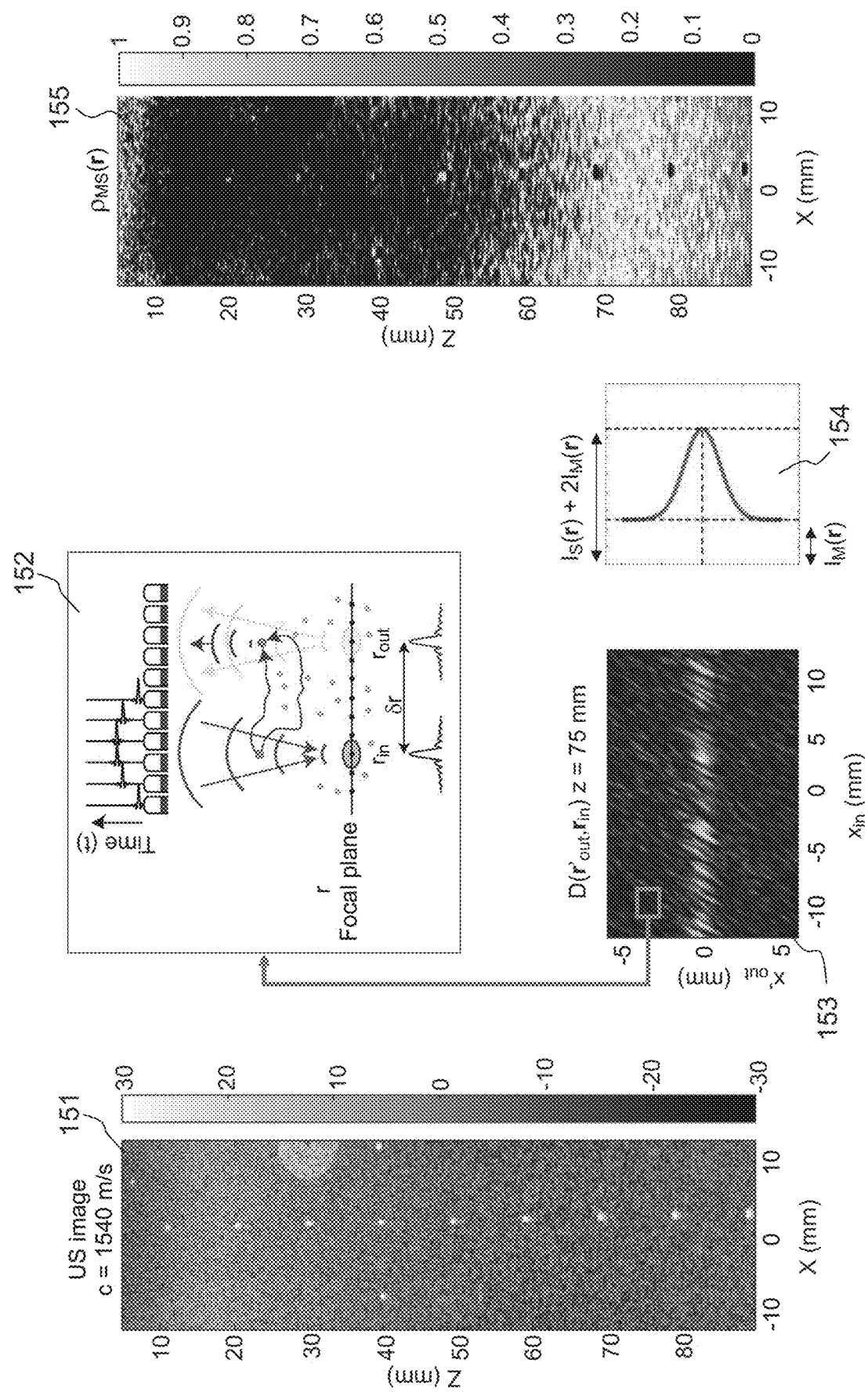
FIG. 15 illustrates an exemplary use of the distortion matrix for the local quantification of multiple scattering and more specifically shows a standard phantom ultrasound image, a diagram explaining the occurrence of multiple scattering in the distortion matrix, the focused distortion matrix for a line of the ultrasound image, an example of a spread function deduced from the preceding matrix showing an incoherent background linked to the multiple scattering component, the multiple scattering rate in each pixel of the ultrasound image.

FIG. 15 illustrates the advantage of the distortion matrix for the local quantification of multiple scattering. FIG. 15 shows a standard phantom ultrasound image 151. Diagram 152 explains the nature of the multiple scattering paths manifesting as an incoherent field in the distortion matrix. These occur upstream of the focal plane since they have the same times of flight as the waves that are singly scattered in the focal plane. A focused distortion matrix is shown in image 153 and corresponds to a line of the ultrasound image (z=75 mm). Its central row ($r_{in}=r_{out}$) clearly shows an overintensity characteristic of the single scattering contribution. However, it has an incoherent background of homogeneous intensity regardless of distance $|r_{in}-r_{out}|$. This incoherent background may be either caused by the noise in the ultrasound measurements, or linked to multiple scattering. To know its origin, the property of spatial reciprocity of waves may be examined. If $R(r_{in}, r_{out})=R(r_{out}, r_{in})$, then it has to do with a signal of physical origin, hence multiple scattering. Otherwise, it can only be noise.

The focused distortion matrix $D_{rr}$ provides access to the spread function 154 of the imaging system at any point of the field of vision. A multiple scattering rate $\gamma(r_{in})$ may be measured locally on the basis of the ratio of the level of the incoherent background ($|r_{out}-r_{in}|\gg\delta$) to the signal level on the central row of $D_{rr}$ ($r_{out}=r_{in}$):

$$\gamma(r_{in}) = \frac{I_M(r_{in})}{I_S(r_{in}) + 2I_M(r_{in})} = \frac{\langle |D(r_{out} \neq r_{in}, r_{in})|^2 \rangle}{|D(r_{out} = r_{in}, r_{in})|^2} \quad (34)$$

where the symbol ⟨ ... ⟩ denotes an average along each row of $D_{rr}$ apart from the central elements ($|r_{out}-r_{in}|\gg\delta$). $I_M(r_{in})=\langle|D(r_{out}\neq r_{in}, r_{in})|^2\rangle$ is the multiple scattering intensity (incoherent background) at the point $r_{in}$. $I_S(r_{in})$ is the single scattering intensity at the point $r_{in}$. Equation (34) indicates that, on the central row ($r_{out}=r_{in}$), there is the following relationship: $|D(r_{out}=r_{in}, r_{in})|^2=I_S(r_{in})+2I_M(r_{in})$. The factor 2 comes from the phenomenon of coherent backscattering which consists of an overintensity by a factor of 2 of the backscattered wave on the virtual source in $r_{in}$ for the multiple scattering contribution. This phenomenon is caused by constructive interference between multiply scattered waves that have followed the same trajectory but in an opposite direction (reciprocal paths) [A. Aubry et al., Appl. Phys. Lett. 92, 124101, 2008].

Image 155 of FIG. 15 shows the multiple scattering rate measured at each point of the ultrasound image 151. At shallow depths, this degree is non-negligible but linked to electronic noise (non-reciprocity of signals). Its increase at great depths is, on the other hand, clearly linked to the phenomenon of multiple scattering. In particular, the multiple scattering rate exceeds 50% beyond a depth of 60 mm.

This measurement is confirmed by previous studies carried out in-vivo [A. Aubry et al., J. Acous. Soc. Am. 129, 225-233, 2011]. The contribution of the present invention resides in the fact that the focused distortion matrix allows local measurement of the multiple scattering rate whereas until now there was access only to an averaged value at each echo time or depth. [A. Aubry et al., J. Acous. Soc. Am. 129, 225-233, 2011].

By taking times longer than the ballistic time [equation (4)], the spread function may also make it possible to follow the growth of the diffusive halo within the medium and derive therefrom a local measurement of the transport parameters of the multiply scattered wave (scattering coefficient or mean free path of transport). Studying the diffusive halo at short times gives access to a much finer spatial resolution than that obtained by the prior art in random scattering tomography [A. Aubry et al., Appl. Phys. Lett. 92, 124101, 2008].

Although described through a number of detailed exemplary embodiments, the methods and systems for non-invasive ultrasound characterization comprise different variants, modifications and refinements which will be obviously apparent to those skilled in the art, it being understood that these different variants, modifications and refinements fall within the scope of the invention, as defined by the claims which follow.

The invention claimed is:

1. A method for the non-invasive ultrasound characterization of a heterogeneous medium, the method comprising:
    a step of generating, by means of at least a first array of transducers, a series of incident ultrasound waves in a region of said heterogeneous medium;
    a step of recording an experimental reflection matrix defined between an emission basis at input and the transducer basis at output;
    a step of determining, on the basis of said experimental reflection matrix, at least a first wideband reflection matrix, defined in a focused basis at input and at output, in a first spectral band;
    a step of determining a first distortion matrix defined in said first spectral band, between said focused basis and an observation basis, said first distortion matrix resulting, directly or after change of basis, from the term-by-term matrix product of said first wideband reflection matrix, defined between said focused basis and an aberration correction basis, with the phase conjugate matrix of a reference reflection matrix, defined for a model medium, between the same bases;
    a step of determining, on the basis of said first distortion matrix, at least one mapping of a physical parameter of said heterogeneous medium.

2. The method as claimed in claim 1, wherein the determination of said first wideband reflection matrix comprises:
    a change of basis at input and at output, from said experimental reflection matrix expressed in the frequency domain to form a reflection matrix, defined in the frequency domain, in a focused basis at input and at output;
    a coherent summation on said first given spectral band of said reflection matrix defined in a focused basis at input and at output to form said first wideband reflection matrix defined in a focused basis at input and at output.

3. The method as claimed in claim 1, wherein the determination of said first distortion matrix comprises:
    a change of basis, at input or at output, of said first wideband reflection matrix defined in a focused basis at input and at output, to obtain said first wideband reflection matrix determined between the focused basis and the aberration correction basis;
    the term-by-term matrix product of said first wideband reflection matrix defined between said focused basis and the aberration correction basis, with the phase conjugate matrix of the reference reflection matrix defined between the same bases.

4. The method as claimed in claim 1, wherein:
    said observation basis is the focused basis;
    said first distortion matrix is defined in a focused basis at input and at output, and is obtained either directly from said first wideband reflection matrix defined in a focused basis at input and at output, or by change of basis from the first distortion matrix defined between the focused basis and the aberration correction basis.

5. The method as claimed in claim 4, wherein the determination of at least one mapping of a physical parameter of said heterogeneous medium comprises determining, from said first distortion matrix defined in a focused basis at input and at output, and for at least one first isoplanatic domain identified, at least one first point spread function (PSF).

6. The method as claimed in claim 1, wherein the determination of at least one mapping of a physical parameter of said heterogeneous medium comprises:
    determining the invariants in said focused basis of said first distortion matrix, in order to identify at least one first isoplanatic domain in said focused basis;
    determining, for each first isoplanatic domain identified, a mapping of at least one first aberration law in said aberration correction basis.

7. The method as claimed in claim 6, wherein the determination of the invariants of said first distortion matrix comprises a singular value decomposition of at least one of the matrices of the group of matrices comprising: said first distortion matrix, said first distortion matrix normalized, a normalized correlation matrix of said first distortion matrix.

8. The method as claimed in claim 6, wherein the determination of at least one mapping of a physical parameter of said heterogeneous medium further comprises determining in said observation basis a first wideband reflection matrix corrected by said one or more first aberration laws.

9. The method as claimed in claim 8, further comprising:
    determining a corrected distortion matrix, defined between said focused basis and said aberration correction basis by the term-by-term matrix product of said corrected first wideband reflection matrix with the phase conjugate matrix of said reference reflection matrix.

10. The method as claimed in claim 9, further comprising:
    determining the invariants in said focused basis of said corrected distortion matrix, in order to identify at least one second isoplanatic domain in said focal plane;
    determining, for each second isoplanatic domain identified, a mapping of a second aberration law in said correction basis.

11. The method as claimed in claim 1, further comprising:
    a step of determining, on the basis of said experimental reflection matrix, at least one second wideband reflection matrix, defined in a focused basis at input and at output, in a second spectral band different from said first spectral band;

a step of determining at least one second distortion matrix defined in said second spectral band between said focused basis and said observation basis, said second distortion matrix resulting, directly or after change of basis, from the term-by-term matrix product of said second wideband reflection matrix, defined between said focused basis and said aberration correction basis, with the phase conjugate matrix of a reference reflection matrix, defined for a model medium, between the same bases.

12. The method as claimed in claim 11, further comprising:

determining the invariants in said focus basis of said at least one second distortion matrix, in order to identify at least one first isoplanatic domain in said focal plane;

determining, for each isoplanatic domain identified, a mapping of at least one first aberration law in said correction basis;

determining, in said observation basis, at least one second wideband reflection matrix corrected by said one or more first aberration laws;

summing said corrected first wideband reflection matrix and said corrected at least one second wideband reflection matrix to form an ultra-wideband corrected reflection matrix.

13. The method as claimed in claim 1, wherein the determination of at least one mapping of a physical parameter of said heterogeneous medium comprises determining the speed of sound in the insonified region.

14. The method as claimed in claim 1, wherein the determination of at least one mapping of a physical parameter of said heterogeneous medium comprises determining a multiple scattering rate in the insonified region.

15. The method as claimed in claim 1, further comprising the identification and/or elimination of the specular reflection and/or multiple reflection components on the basis of said first distortion matrix, which is expressed at input and at output in the plane wave basis.

16. A system for the non-invasive ultrasound characterization of a heterogeneous medium comprising:

at least one first array of transducers that is configured to generate a series of incident ultrasound waves in a region of said heterogeneous medium and to record the ultrasound waves backscattered by said region as a function of time;

a computing unit, coupled to said at least one first array of transducers, and configured to:

record an experimental reflection matrix defined between an emission basis at input and the transducer basis at output;

determine, on the basis of said experimental reflection matrix, at least one first wideband reflection matrix, defined in a focused basis at input and at output, in a first given spectral band;

determine a first distortion matrix defined in said first spectral band, between said focused basis and an observation basis, said first distortion matrix resulting, directly or after change of basis, from the term-by-term matrix product of said first wideband reflection matrix, defined between said focused basis and an aberration correction basis, with the phase conjugate matrix of a reference reflection matrix, defined for a model medium, between the same bases;

determine, on the basis of said first distortion matrix, at least one mapping of a physical parameter of said heterogeneous medium.

* * * * *